US009177392B2

(12) United States Patent
Sato

(10) Patent No.: US 9,177,392 B2
(45) Date of Patent: Nov. 3, 2015

(54) IMAGE PROCESSING APPARATUS AND IMAGE PROCESSING METHOD

(75) Inventor: Kazushi Sato, Tokyo (JP)

(73) Assignee: Sony Corporation, Tokyo (JP)

( * ) Notice: Subject to any disclaimer, the term of this patent is extended or adjusted under 35 U.S.C. 154(b) by 101 days.

(21) Appl. No.: 14/003,063

(22) PCT Filed: Mar. 1, 2012

(86) PCT No.: PCT/JP2012/055237
§ 371 (c)(1),
(2), (4) Date: Sep. 4, 2013

(87) PCT Pub. No.: WO2012/124497
PCT Pub. Date: Sep. 20, 2012

(65) Prior Publication Data
US 2013/0343663 A1    Dec. 26, 2013

(30) Foreign Application Priority Data
Mar. 11, 2011    (JP) ................................. 2011-054560

(51) Int. Cl.
G06K 9/00    (2006.01)
G06T 9/00    (2006.01)
H04N 19/52    (2014.01)
H04N 19/61    (2014.01)
H04N 19/174    (2014.01)
H04N 19/436    (2014.01)

(52) U.S. Cl.
CPC ................. *G06T 9/00* (2013.01); *H04N 19/174* (2014.11); *H04N 19/436* (2014.11); *H04N 19/52* (2014.11); *H04N 19/61* (2014.11)

(58) Field of Classification Search
None
See application file for complete search history.

(56) References Cited

U.S. PATENT DOCUMENTS

2008/0117977 A1 * 5/2008 Lee et al. ................. 375/240.16
2009/0232217 A1 * 9/2009 Lee et al. ................. 375/240.16

FOREIGN PATENT DOCUMENTS

JP    2004-208258    7/2004
JP    2004-235683    8/2004

(Continued)

OTHER PUBLICATIONS

Jung, et al., Competition-Based Scheme for Motion Vector Selection and Coding, ITU—Telecommunications Standardization Sector, Study Group 16 Question 6, Video Coding Experts Group (VCEG), 29th Meeting, Jul. 17-18, 2006, Klagenfurt, Austria.

(Continued)

*Primary Examiner* — Hadi Akhavannik
(74) *Attorney, Agent, or Firm* — Paratus Law Group, PLLC

(57) ABSTRACT

The present technique relates to an image processing apparatus and an image processing method which allow the encoding efficiency to be improved. The image processing apparatus includes: a determination unit which determines whether neighboring motion information is available or unavailable, the neighboring motion information being motion information of a neighboring region located around a current region and being used to encode motion information of the current region to be processed; and an encoding unit which encodes the motion information of the current region by using available motion information of another neighboring region in place of the motion information of the neighboring region determined by the determination unit to be unavailable. The present disclosure can be applied to an image processing apparatus.

10 Claims, 28 Drawing Sheets

(56) References Cited

FOREIGN PATENT DOCUMENTS

JP    2008-283490    11/2008
JP    2010-524397    7/2010

OTHER PUBLICATIONS

Wiegand, et al., WD1: Working Draft 1 of High-Efficiency Video Coding, Joint Collaborative Team on Video Coding (JCT-VC) of ITU-T SG16 WP3 and ISO/IEC JTC1/SC29/WG11, 3$^{rd}$ Meeting, Oct. 7-15, 2010, Guangzhou, China.

Winken, et al., Video Coding Technology Proposal by Fraunhofer HHI, JCTVC-A116.

Feb. 19, 2015, JP communication issued for related JP application No. 2011-054560.

Yusuke Itani, et al., Improvement to AMVP/Merge process, Joint Collaborative Team on Video Coding (JCT-VC) of ITU-T SG16 WP3 and ISO/IEC JTC1/SC29/WG11, Mar. 16-23, 2011, pp. 1-7, 5$^{th}$ Meeting: Geneva, CH.

* cited by examiner

| Slice_type | Name of Slice_type |
|---|---|
| 0 | P(P slice) |
| 1 | B(B slice) |
| 2 | I(I slice) |
| 3 | SP(SP slice) |
| 4 | SI(SI slice) |
| 5 | P(P slice) |
| 6 | B(B slice) |
| 7 | I(I slice) |
| 8 | SP(SP slice) |
| 9 | SI(SI slice) |

IMAGE PROCESSING APPARATUS AND IMAGE PROCESSING METHOD

CROSS REFERENCE TO PRIOR APPLICATION

This application is a National Stage Patent Application of PCT International Patent Application No. PCT/JP2012/055237 (filed on Mar. 1, 2012) under 35 U.S.C. §371, which claims priority to Japanese Patent Application No. 2011-054560 (filed on Mar. 11, 2011), which are all hereby incorporated by reference in their entirety.

TECHNICAL FIELD

The present disclosure relates to an image processing apparatus and an image processing method, particularly to an image processing apparatus and an image processing method by which encoding efficiency can be improved.

BACKGROUND ART

In recent years, an apparatus conforming to an MPEG (Moving Picture Experts Group) scheme and the like is becoming widespread in both broadcast stations which distribute information and ordinary households which receive information, where the MPEG scheme treats image information as digital and compresses the information, for the purpose of efficiently transmitting and storing information, by means of an orthogonal transform such as a discrete cosine transform and motion compensation while exploiting redundancy specific to the image information.

MPEG-2 (ISO (International Organization for Standardization)/IEC (International Electrotechnical Commission) 13818-2), in particular, is defined as a general-purpose image encoding scheme that is a standard covering both an interlaced scan image and a progressive scan image as well as images with a standard resolution and a high resolution. The MPEG-2 is now used widely in a wide range of applications for use by professionals and consumers. The use of the MPEG-2 compression scheme can realize a high compression ratio and satisfactory image quality by assigning a code amount (bit rate) of 4 to 8 Mbps to an interlaced scan image with a standard resolution having 720×480 pixels, or 18 to 22 Mbps to an interlaced scan image with a high resolution having 1920×1088 pixels, for example.

The MPEG-2 has targeted high image-quality encoding adapted mainly for broadcasting, but has not been suited for an encoding scheme with a code amount (bit rate) lower than that of MPEG-1, namely, an encoding scheme with a higher compression ratio. The need for such encoding scheme is expected to increase in the future as a mobile terminal is coming into wide use. In response, an MPEG-4 encoding scheme has been standardized. With regards to the image encoding scheme, the standard was approved as an international standard ISO/IEC 14496-2 in December, 1998.

Furthermore, a standard named H.26L (ITU-T (International Telecommunication Union Telecommunication Standardization Sector) Q6/16 VCEG (Video Coding Expert Group)), which is initially intended for encoding an image used in a television conference, has been in the process of becoming standardized in recent years. While requiring a greater amount of calculation in encoding and decoding compared to the conventional encoding schemes such as the MPEG-2 and the MPEG-4, the H.26L is known to achieve higher encoding efficiency. As a part of the actions pertaining to the MPEG-4, moreover, a standardization achieving yet higher encoding efficiency by using the H.26L as a base and incorporating a function not supported in the H.26L has currently been in the process as Joint Model of Enhanced-Compression Video Coding.

The standard became an international standard in March, 2003 under the name of H.264 and MPEG-4 Part 10 (Advanced Video Coding; hereinafter noted as AVC) regarding the standardization schedule.

However, it was concerned that a macroblock size of 16 pixels×16 pixels was not optimal for a large picture frame provided in UHD (Ultra High Definition; 4000 pixels×2000 pixels) which is to be the target for a next-generation encoding scheme.

Accordingly, a JCTVC (Joint Collaboration Team-Video Coding) that is a joint standardization group formed by the ITU-T and the ISO/IEC is currently working to standardize an encoding scheme called an HEVC (High Efficiency Video Coding) for the purpose of further improving the encoding efficiency achieved by the AVC (refer to Non-Patent Document 1, for example).

The HEVC encoding scheme defines a coding unit (CU) as a processing unit similar to the macroblock used in the AVC. Unlike the macroblock used in the AVC, the size of the CU is not fixed to 16×16 pixels but specified within image compression information in each sequence.

Now, in order to improve encoding of a motion vector employing median prediction in the AVC, there has been proposed to adaptively use any of a "temporal predictor" and a "spatio-temporal predictor", in addition to a "spatial predictor" required in the median prediction and defined in the AVC, as predictive motion vector information (hereinafter also referred to as MV competition) (refer to Non-Patent Document 2, for example).

In an image information encoding device, a cost function value when using respective predictive motion vector information for each block is calculated to select the optimal predictive motion vector information. Flag information indicating information on which of the predictive motion vector information is used for each block is transmitted to image compression information.

Moreover, there has been proposed a method called Motion Partition Merging (hereinafter also referred to as a merge mode) as one scheme of encoding motion information (refer to Non-Patent Document 3, for example). In this method, only the flag information is transmitted when the motion information for a current block is identical to the motion information for a neighboring block, and the motion information for the current block is reconstructed by using the motion information for the neighboring block at the time of decoding.

In order to parallelize a process, for example, the image encoding schemes such as the AVC and the HEVC provide a method in which a picture is divided into a plurality of slices so that a process is performed for each slice. An entropy slice is also proposed in addition to the slice.

The entropy slice is a processing unit adopted in an entropy encoding process and an entropy decoding process. That is, in the entropy encoding process and the entropy decoding process, a picture is divided into a plurality of entropy slices so that a process is performed for each entropy slice. In a prediction process, on the other hand, the process is performed for each picture without applying the slice division.

CITATION LIST

Non-Patent Document

Non-Patent Document 1: Thomas Wiegand, Woo-Jin Han, Benjamin Bross, Jens-Rainer Ohm, Gary J. Sullivan, "Working Draft 1 of High-Efficiency Video Coding", JCTVC-C403, Joint Collaborative Team on Video Coding (JCT-VC) of ITU-T SG16 WP3 and ISO/IEC JTC1/SC29/WG113rd Meeting: Guangzhou, CN, 7-15 Oct. 2010.

Non-Patent Document 2: Joel Jung, Guillaume Laroche, "Competition-Based Scheme for Motion Vector Selection and Coding", VCEG-AC06, ITU—Telecommunications Standardization SectorSTUDY GROUP 16 Question 6Video Coding Experts Group (VCEG) 29th Meeting: Klagenfurt, Austria, 17-18 Jul. 2006.

Non-Patent Document 3: Martin Winken, Sebastian Bosse, Benjamin Bross, Philipp Helle, Tobias Hinz, Heiner Kirchhoffer, Haricharan Lakshman, Detlev Marpe, Simon Oudin, Matthias Preiss, Heiko Schwarz, Mischa Siekmann, Karsten Suchring, and Thomas Wiegand, "Description of video coding technology proposed by Fraunhofer HHI", JCTVC-A116, April, 2010.

SUMMARY OF THE INVENTION

Problems to be Solved by the Invention

However, as described above, the MV competition and the merge mode require reference to the motion information of a neighboring region located around a current region when processing the motion information of the current region to be processed. As a result, there has been a possibility that, when dividing the picture into the plurality of slices (including the entropy slice) to perform the process for each slice, the neighboring region is located outside the slice of the current region and is unavailable depending on the location of the current region. It has therefore been concerned that the number of candidates decreases when employing the MV competition and the merge mode, thereby leading to a decrease in the encoding efficiency.

The present disclosure has been proposed in consideration of such situations. An object of the present disclosure is to be able to suppress the decrease in the encoding efficiency when employing the MV competition and the merge mode in the image encoding in which a picture is divided into a plurality of slices so that a process is performed in parallel for each slice.

Solutions to Problems

One aspect of the present disclosure is an image processing apparatus including: a determination unit which determines whether or not motion information of a neighboring region located around a current region is available, the motion information of the neighboring region being used to encode motion information of the current region to be processed; and an encoding unit which encodes the motion information of the current region by using available motion information of another neighboring region in place of the motion information, which is determined to be unavailable by the determination unit, of the neighboring region.

The determination unit determines whether or not the motion information of the neighboring region is available on the basis of an address of a boundary of a current slice including the current region and an address of the current region, the current slice being one of a plurality of slices into which a frame is divided.

The determination unit determines that the motion information of the neighboring region is unavailable when the neighboring region is located outside the current slice of a current frame to be processed.

The encoding unit includes: a candidate setting part which, when motion information of a neighboring region to be a candidate region to merge with the current region is unavailable, sets another neighboring region with available motion information as the candidate in place of the neighboring region; and a merge information generation part which determines, from among the candidate set by the candidate setting part, a neighboring region to merge with the current region and generates merge information.

The candidate setting part sets a co-located region of the neighboring region determined to be unavailable by the determination unit as the candidate when the co-located region is available.

The candidate setting part sets another neighboring region located within a current slice to be processed in a current frame to be processed as the candidate, the current slice being one of a plurality of slices into which a frame is divided.

The candidate setting part sets a neighboring region located within a reference frame, to which a current frame to be processed refers, as the candidate when the neighboring region determined to be unavailable by the determination unit is located outside the current frame.

The encoding unit includes: a candidate setting part which, when motion information of a neighboring region to be a candidate for predictive motion vector information of the current region is unavailable, sets available motion information of another neighboring region as the candidate in place of the motion information; and a predictive motion vector generation part which uses any of the candidate set by the candidate setting part to generate the predictive motion vector information of the current region.

The candidate setting part sets a co-located region of the neighboring region determined to be unavailable by the determination unit as the candidate when the co-located region is available.

The candidate setting part sets another neighboring region located within a current slice to be processed in a current frame to be processed as the candidate, the current slice being one of a plurality of slices into which a frame is divided.

The candidate setting part sets a neighboring region located within a reference frame, to which a current frame to be processed refers, as the candidate when the neighboring region determined to be unavailable by the determination unit is located outside the current frame.

One aspect of the present disclosure is a method of processing an image in an image processing apparatus, wherein a determination unit determines whether or not motion information of a neighboring region located around a current region is available, the motion information of the neighboring region being used to encode motion information of the current region to be processed, and an encoding unit encodes the motion information of the current region by using available motion information of another neighboring region in place of the motion information, which is determined to be unavailable, of the neighboring region.

Another aspect of the present disclosure is an image processing apparatus including: a determination unit which determines whether or not motion information of a neighboring region located around a current region is available, the motion information of the neighboring region being used to decode motion information of the current region to be processed; and a decoding unit which decodes encoded motion information of the current region by using available motion information of another neighboring region in place of the motion information, which is determined to be unavailable by the determination unit, of the neighboring region.

The determination unit determines whether or not the motion information of the neighboring region is available on the basis of an address of a boundary of a current slice including the current region and an address of the current region, the current slice being one of a plurality of slices into which a frame is divided.

The determination unit determines that the motion information of the neighboring region is unavailable when the neighboring region is located outside the current slice of a current frame to be processed.

The decoding unit includes: a candidate setting part which, when motion information of a neighboring region to be a candidate region to merge with the current region is unavailable, sets another neighboring region with available motion information as the candidate in place of the neighboring region; and a merge information decoding part which determines, from among the candidate set by the candidate setting part, a neighboring region to merge with the current region and decodes merge information according to the determination.

The candidate setting part sets a co-located region of the neighboring region determined to be unavailable by the determination unit as the candidate when the co-located region is available.

The candidate setting part sets another neighboring region located within a current slice to be processed in a current frame to be processed as the candidate, the current slice being one of a plurality of slices into which a frame is divided.

The candidate setting part sets a neighboring region located within a reference frame, to which a current frame to be processed refers, as the candidate when the neighboring region determined to be unavailable by the determination unit is located outside the current frame.

The decoding unit includes: a candidate setting part which, when motion information of a neighboring region to be a candidate for predictive motion vector information of the current region is unavailable, sets available motion information of another neighboring region as the candidate in place of the motion information; and a predictive motion vector reconstruction part which uses any of the candidate set by the candidate setting part to reconstruct the predictive motion vector information of the current region.

The candidate setting part sets a co-located region of the neighboring region determined to be unavailable by the determination unit as the candidate when the co-located region is available.

The candidate setting part sets another neighboring region located within a current slice to be processed in a current frame to be processed as the candidate, the current slice being one of a plurality of slices into which a frame is divided.

The candidate setting part sets a neighboring region located within a reference frame, to which a current frame to be processed refers, as the candidate when the neighboring region determined to be unavailable by the determination unit is located outside the current frame.

Another aspect of the present disclosure is a method of processing an image in an image processing apparatus, wherein a determination unit determines whether or not motion information of a neighboring region located around a current region is available, the motion information of the neighboring region being used to decode motion information of the current region to be processed, and a decoding unit decodes the motion information of the current region by using available motion information of another neighboring region in place of the motion information, which is determined to be unavailable, of the neighboring region.

In one aspect of the present disclosure, it is determined whether or not the motion information of the neighboring region located around the current region is available, the motion information of the neighboring region being used to encode the motion information of the current region to be processed. The motion information of the current region is encoded by using available motion information of another neighboring region, in place of the motion information of the neighboring region determined to be unavailable.

In another aspect of the present disclosure, it is determined whether or not the motion information of the neighboring region located around the current region is available, the motion information of the neighboring region being used to decode the motion information of the current region to be processed. The motion information of the current region is decoded by using available motion information of another neighboring region, in place of the motion information of the neighboring region determined to be unavailable.

Effects of the Invention

According to the present disclosure, an image can be processed and, particularly, a decrease in the encoding efficiency can be suppressed.

MODES FOR CARRYING OUT THE INVENTION

Modes for carrying out the present disclosure (hereinafter referred to as embodiments) will be described below. The description will be provided in the following order.
1. First embodiment (an image encoding device)
2. Second embodiment (an image decoding device)
3. Third embodiment (a personal computer)
4. Fourth embodiment (a television set)
5. Fifth embodiment (a mobile telephone)
6. Sixth embodiment (a recording/reproducing device)
7. Seventh embodiment (an imaging device)

1. First Embodiment

Image Encoding Device

Figure 1:
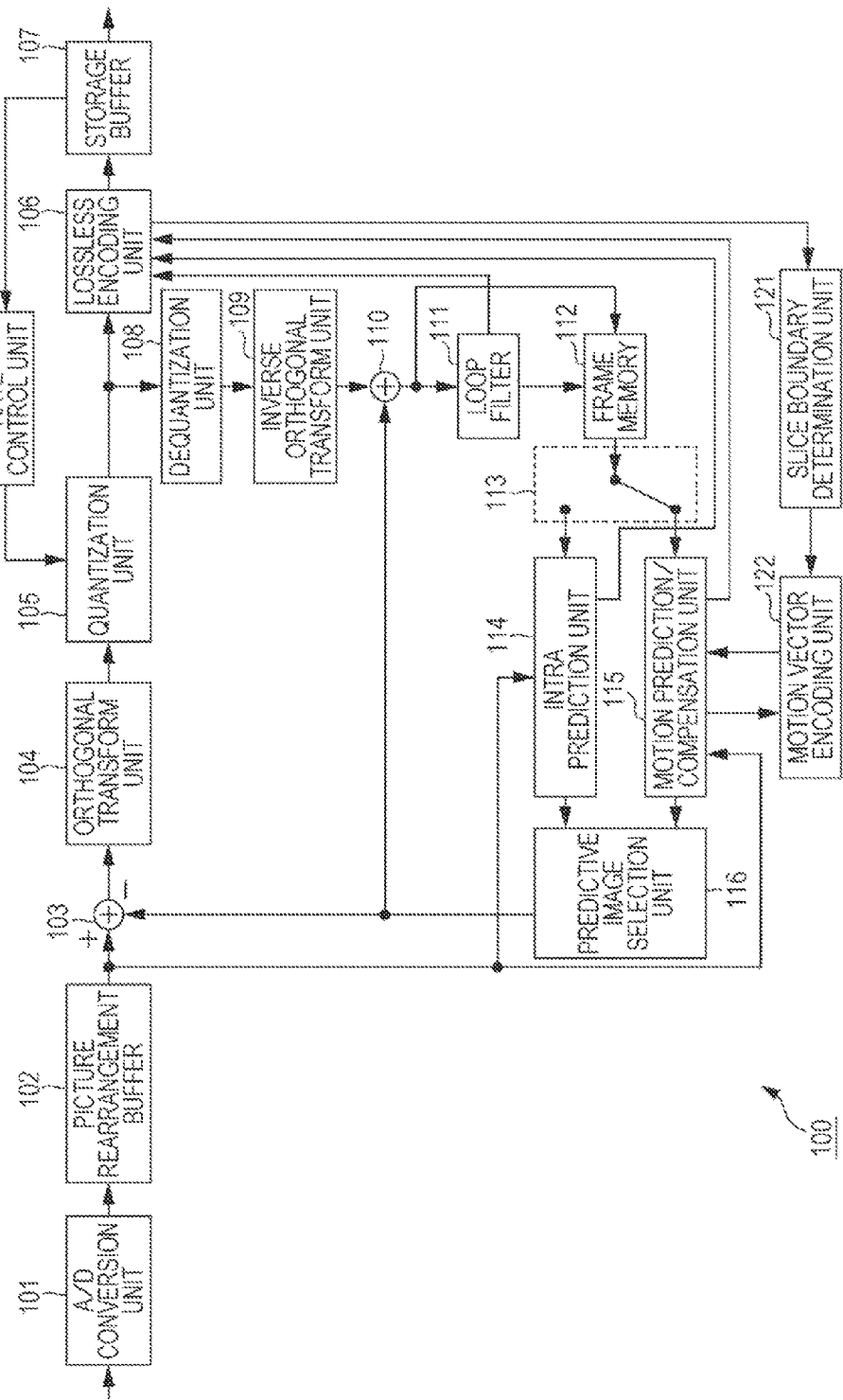
FIG. 1 is a block diagram illustrating an example of a main configuration of an image encoding device.

FIG. 1 is a block diagram illustrating an example of a main configuration of an image encoding device.

An image encoding device 100 illustrated in FIG. 1 encodes image data while employing a prediction process as performed in an encoding scheme such as H.264 or MPEG (Moving Picture Experts Group) 4 Part 10 (AVC (Advanced Video Coding)).

As illustrated in FIG. 1, the image encoding device 100 includes an A/D conversion unit 101, a picture rearrangement buffer 102, a calculator 103, an orthogonal transform unit 104, a quantization unit 105, a lossless encoding unit 106, a storage buffer 107, a dequantization unit 108, an inverse orthogonal transform unit 109, a calculator 110, a loop filter 111, a frame memory 112, a selection unit 113, an intra prediction unit 114, a motion prediction/compensation unit 115, a predictive image selection unit 116, and a rate control unit 117.

The image encoding device 100 further includes a slice boundary determination unit 121 and a motion vector encoding unit 122.

The A/D conversion unit 101 performs A/D conversion on input image data and supplies the converted image data (digital data) to the picture rearrangement buffer 102 so as to store the converted image data therein. The picture rearrangement buffer 102 rearranges a frame arranged in the order of display in the stored image into the order adopted for encoding in accordance with GOP (Group Of Picture), and thereafter supplies the image with the rearranged frame order to the calculator 103. The picture rearrangement buffer 102 further supplies the image with the rearranged frame order to the intra prediction unit 114 and the motion prediction/compensation unit 115.

The calculator 103 subtracts a predictive image supplied by the intra prediction unit 114 or the motion prediction/compensation unit 115 via the predictive image selection unit 116 from the image read out of the picture rearrangement buffer 102, and outputs the differential information to the orthogonal transform unit 104.

When the image is subjected to inter encoding, for example, the calculator 103 subtracts the predictive image supplied by the motion prediction/compensation unit 115 from the image read out of the picture rearrangement buffer 102.

The orthogonal transform unit 104 performs an orthogonal transform such as a discrete cosine transform or a Karhunen-Loeve transform on the differential information supplied from the calculator 103. Note that the orthogonal transform method is selected arbitrarily. The orthogonal transform unit 104 then supplies the transform coefficient to the quantization unit 105.

The quantization unit 105 quantizes the transform coefficient supplied from the orthogonal transform unit 104. That is, the quantization unit 105 sets a quantization parameter on the basis of information regarding a target value of a code amount supplied from the rate control unit 117 and performs the quantization. Note that a method of this quantization is selected arbitrarily. The quantization unit 105 then supplies the quantized transform coefficient to the lossless encoding unit 106.

The lossless encoding unit 106 encodes the transform coefficient quantized in the quantization unit 105 by employing an arbitrary encoding scheme. Since the coefficient data is quantized under control of the rate control unit 117, the code amount corresponds with the target value set by the rate control unit 117 (or approaches to the target value).

Furthermore, the lossless encoding unit 106 acquires information representing a mode of intra prediction and the like from the intra prediction unit 114 and acquires information representing a mode of inter prediction, motion vector information and the like from the motion prediction/compensation unit 115. The lossless encoding unit 106 further acquires a filter coefficient and the like used in the loop filter 111.

The lossless encoding unit 106 encodes these various pieces of information by an arbitrary encoding scheme and makes it a part of header information of the encoded data (i.e., multiplexing). The lossless encoding unit 106 then supplies the encoded data obtained by the encoding to the storage buffer 107 and stores the data therein.

The lossless encoding unit 106 can employ variable length encoding or arithmetic encoding, for example, as the encoding scheme. CAVLC (Context-Adaptive Variable Length Coding) specified in the H.264/AVC scheme, for example, can be employed as the variable length encoding. CABAC (Context-Adaptive Binary Arithmetic Coding) can be employed as the arithmetic encoding, for example.

The storage buffer 107 temporarily holds the encoded data supplied from the lossless encoding unit 106. At a predetermined timing, the storage buffer 107 outputs the encoded data being held therein to a recording device (a recording medium) or a transmission path that is not shown but disposed in a following stage.

The transform coefficient quantized in the quantization unit 105 is also supplied to the dequantization unit 108. The dequantization unit 108 dequantizes the quantized transform coefficient by a method corresponding to the quantization performed by the quantization unit 105. The dequantization method may be any method as long as it corresponds to the quantization process performed by the quantization unit 105. The dequantization unit 108 supplies the transform coefficient obtained to the inverse orthogonal transform unit 109.

The inverse orthogonal transform unit 109 performs an inverse orthogonal transform on the transform coefficient supplied from the dequantization unit 108 by a method corresponding to an orthogonal transform process performed by the orthogonal transform unit 104. The inverse orthogonal transform method may be any method as long as it corresponds to the orthogonal transform process performed by the orthogonal transform unit 104. The output (restored differential information) that has undergone the inverse orthogonal transform is supplied to the calculator 110.

The calculator 110 adds a predictive image supplied from the intra prediction unit 114 or the motion prediction/compensation unit 115 via the predictive image selection unit 116 to the outcome of the inverse orthogonal transform, namely, the restored differential information, supplied from the inverse orthogonal transform unit 109. The calculator 110 thereby acquires a locally decoded image (a decoded image), which is supplied to the loop filter 111 or the frame memory 112.

The loop filter 111 includes a deblocking filter, an adaptive loop filter, and the like and appropriately performs a filtering process on the decoded image supplied from the calculator 110. The loop filter 111 removes block distortion in the decoded image, for example, by performing a deblocking filter process on the decoded image. The loop filter 111 also improves image quality by performing a loop filter process on the outcome of the deblocking filter process (the decoded image from which the block distortion has been removed) by using a Wiener filter, for example.

Note that the loop filter 111 may be adapted to perform an arbitrary filter process on the decoded image. The loop filter 111 can also supply information such as a filter coefficient used in the filter process to the lossless encoding unit 106 as needed in order to encode the information.

The loop filter 111 supplies the outcome of the filter process (the decoded image following the filter process) to the frame memory 112. Note that the decoded image output from the calculator 110 can be supplied to the frame memory 112 without passing through the loop filter 111 as described above, meaning that the filter process by the loop filter 111 can be omitted.

The frame memory 112 stores the decoded image supplied thereto and supplies the stored decoded image to the selection unit 113 as a reference image at a predetermined timing.

The selection unit 113 selects a destination to which the reference image supplied from the frame memory 112 is supplied. When performing the inter prediction, for example, the selection unit 113 supplies the reference image supplied from the frame memory 112 to the motion prediction/compensation unit 115.

The intra prediction unit 114 uses a pixel value within a picture to be processed that is the reference image supplied from the frame memory 112 through the selection unit 113 and performs intra prediction (intra-picture prediction) that generates a predictive image with a prediction unit (PU) as a basic processing unit. The intra prediction unit 114 performs this intra prediction in a plurality of modes (intra prediction modes) prepared in advance.

The intra prediction unit 114 generates a predictive image in all candidate intra prediction modes, evaluates a cost function value for each predictive image by using the input image supplied from the picture rearrangement buffer 102, and selects an optimal mode. Upon selecting the optimal intra prediction mode, the intra prediction unit 114 supplies the predictive image generated in the optimal mode to the predictive image selection unit 116.

Furthermore, as described above, the intra prediction unit 114 appropriately supplies intra prediction mode information or the like representing the adopted intra prediction mode to the lossless encoding unit 106, which then encodes the information.

The motion prediction/compensation unit 115 performs motion prediction (inter prediction) with the PU as a basic processing unit by using the input image supplied from the picture rearrangement buffer 102 and the reference image supplied from the frame memory 112 through the selection unit 113, performs a motion compensation process in accordance with a motion vector detected, and generates a predictive image (inter predictive image information). The motion prediction/compensation unit 115 performs this inter prediction in a plurality of modes (inter prediction modes) prepared in advance.

The motion prediction/compensation unit 115 generates a predictive image in all candidate inter prediction modes, evaluates a cost function value for each predictive image, and selects an optimal mode. Upon selecting the optimal inter prediction mode, the motion prediction/compensation unit 115 supplies the predictive image generated in the optimal mode to the predictive image selection unit 116.

Furthermore, the motion prediction/compensation unit 115 supplies information representing the adopted inter prediction mode and information required to perform a process in the inter prediction mode in decoding the encoded data to the lossless encoding unit 106, which then encodes the information.

The predictive image selection unit 116 selects an origin from which the predictive image is supplied to the calculator 103 and the calculator 110. When performing the inter encoding, for example, the predictive image selection unit 116 selects the motion prediction/compensation unit 115 as the origin from which the predictive image is supplied, and supplies the predictive image supplied from the motion prediction/compensation unit 115 to the calculator 103 and the calculator 110.

The rate control unit 117 controls the rate of quantizing operation performed by the quantization unit 105 on the basis of the code amount of the encoded data accumulated in the storage buffer 107 so as not to cause overflow or underflow.

The slice boundary determination unit 121 determines whether or not a current region to be processed is located in the vicinity of a slice boundary and supplies the result of the determination to the motion vector encoding unit 122. The motion vector encoding unit 122 defines a neighboring region according to the location of the current region with respect to the slice boundary.

The motion prediction/compensation unit 115 performs a process such as MV competition or merge mode by using information on the neighboring region defined by the motion vector encoding unit 122.

[Quarter-Pixel Precision Motion Prediction]

Figure 2:
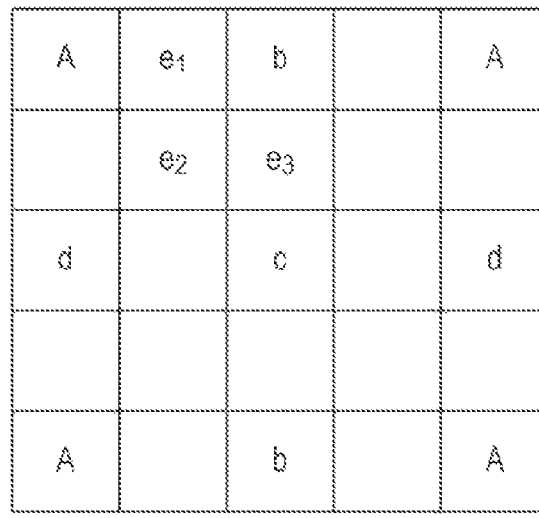
FIG. 2 is a diagram illustrating an example of a motion prediction/compensation process with decimal pixel precision.

FIG. 2 is a diagram illustrating an example of how the motion prediction/compensation process with quarter-pixel precision specified by the AVC encoding scheme is performed. Each quadrangle in FIG. 2 represents a pixel. The quadrangle indicated by A represents a position of a pixel having integer precision stored in the frame memory 112. The quadrangle indicated by b, c, and d represents a position with half-pixel precision. The quadrangle indicated by e1, e2, and e3 represents a position with quarter-pixel precision.

A function Clip1( ) will be hereinafter defined as the following expression (1).

[Expression 1]

$$\text{Clip1}(a) = \begin{cases} 0; & \text{if}(a < 0) \\ a; & \text{otherwise} \\ \text{max\_pix}; & \text{if}(a > \text{max\_pix}) \end{cases} \quad (1)$$

For example, the value of max pix in expression (1) is 255 when the input image has 8-bit precision.

The pixel value for each of the positions b and d is generated as expressed in the following expressions (2) and (3) while using a 6-tap FIR filter.

[Expression 2]

$$F = A_{-2} - 5 \cdot A_{-1} + 20 \cdot A_0 + 20 \cdot A_1 - 5 \cdot A_2 + A_3 \quad (2)$$

[Expression 3]

$$b, d = \text{Clip1}((F + 16) \gg 5) \quad (3)$$

The pixel value for the position indicated by c is generated as expressed in the following expressions (4) to (6) while applying the 6-tap FIR filter in horizontal and vertical directions.

[Expression 4]

$$F = b_{-2} - 5 \cdot b_{-1} + 20 \cdot b_0 + 20 \cdot b_1 - 5 \cdot b_2 + b_3 \quad (4)$$

OR,

[Expression 5]

$$F = d_{-2} - 5 \cdot d_{-1} + 20 \cdot d_0 + 20 \cdot d_1 - 5 \cdot d_2 + d_3 \quad (5)$$

[Expression 6]

$$c = \text{Clip1}((F + 512) \gg 10) \quad (6)$$

Note that a Clip process is performed only once at the end after performing a product-sum operation in both the horizontal direction and the vertical direction.

The value for each of the positions e1 to e3 is generated by linear interpolation as expressed in the following expressions (7) to (9).

[Expression 7]

$$e_1 = (A + b + 1) \gg 1 \quad (7)$$

[Expression 8]

$$e_2 = (b + d + 1) \gg 1 \quad (8)$$

[Expression 9]

$$e_3 = (b + c + 1) \gg 1 \quad (9)$$

[Macroblock]

The MPEG-2 performs the motion prediction/compensation process by the unit of 16×16 pixels in a frame motion compensation mode and 16×8 pixels in each of a first field and a second field in a field motion compensation mode.

Figure 3:
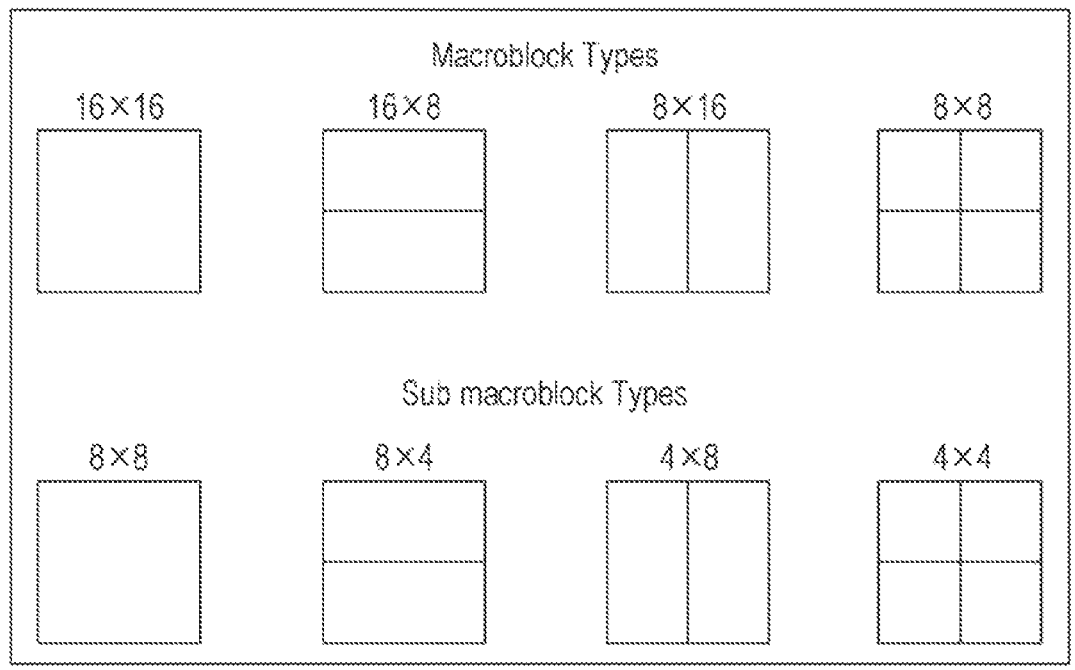
FIG. 3 is a diagram illustrating an example of a macroblock.

In the AVC scheme, on the other hand, a single macroblock configured by 16×16 pixels can be partitioned into 16×16, 16×8, 8×16, or 8×8 pixels as illustrated in FIG. 3 so that each sub macroblock can have independent motion vector information. The partition of 8×8 pixels can be further divided into any sub macroblock of 8×8, 8×4, 4×8, or 4×4 pixels as illustrated in FIG. 3 so that each can have independent motion vector information.

It has been concerned, however, that a large amount of motion vector information is generated in the AVC image encoding scheme when the motion prediction/compensation process is performed in the same manner as is performed in the MPEG-2. It has therefore been concerned that encoding the large amount of generated motion vector information altogether causes the encoding efficiency to decrease.

[Median Prediction in Motion Vector]

As a method which solves the aforementioned problem, the AVC image encoding has implemented the following method and reduced the amount of encoding information for the motion vector.

Figure 4:
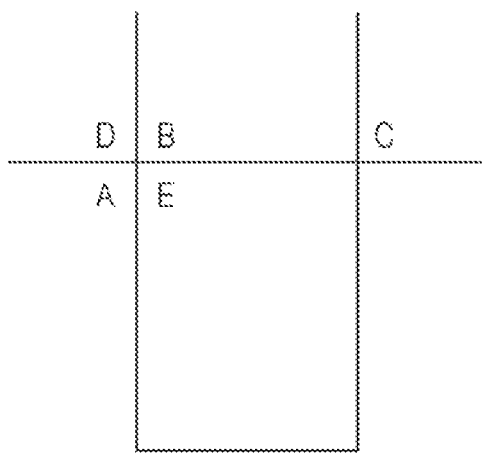
FIG. 4 is a diagram illustrating an example of how a median operation is performed.

Each straight line illustrated in FIG. 4 represents a boundary of a motion compensation block. In FIG. 4, a letter E represents a current motion compensation block which is to be encoded, while each of letters A to D represents a motion compensation block which has already been encoded and is adjacent to the block E.

Now, let X=A, B, C, D, and E, and the motion vector information for X be $mv_X$.

First, the motion vector information for the motion compensation blocks A, B, and C is used to generate predictive motion vector information $pmv_E$ for the motion compensation block E by a median operation as expressed in the following expression (10).

[Expression 10]

$$pmv_E = \text{med}(mv_A, mv_B, mv_c) \quad (10)$$

The information for the motion compensation block D is substituted for the information for the motion compensation block C when the information for the motion compensation block C is unavailable because it is at the edge of the picture frame, for example.

Data $mvd_E$ that is encoded as the motion vector information for the motion compensation block E in the image compression information is generated by using $pmv_E$ as expressed in the following expression (11).

[Expression 11]

$$mvd_E = mv_E - pmv_E \quad (11)$$

Note that the actual process is performed independently for each of the horizontal and vertical components of the motion vector information.

[Multi-Reference Frame]

Also specified in the AVC is a system called a multi-reference frame that has not been specified in the conventional image encoding scheme such as the MPEG-2 and the H.263.

The multi-reference frame specified in the AVC will now be described with reference to FIG. 5.

Figure 5:
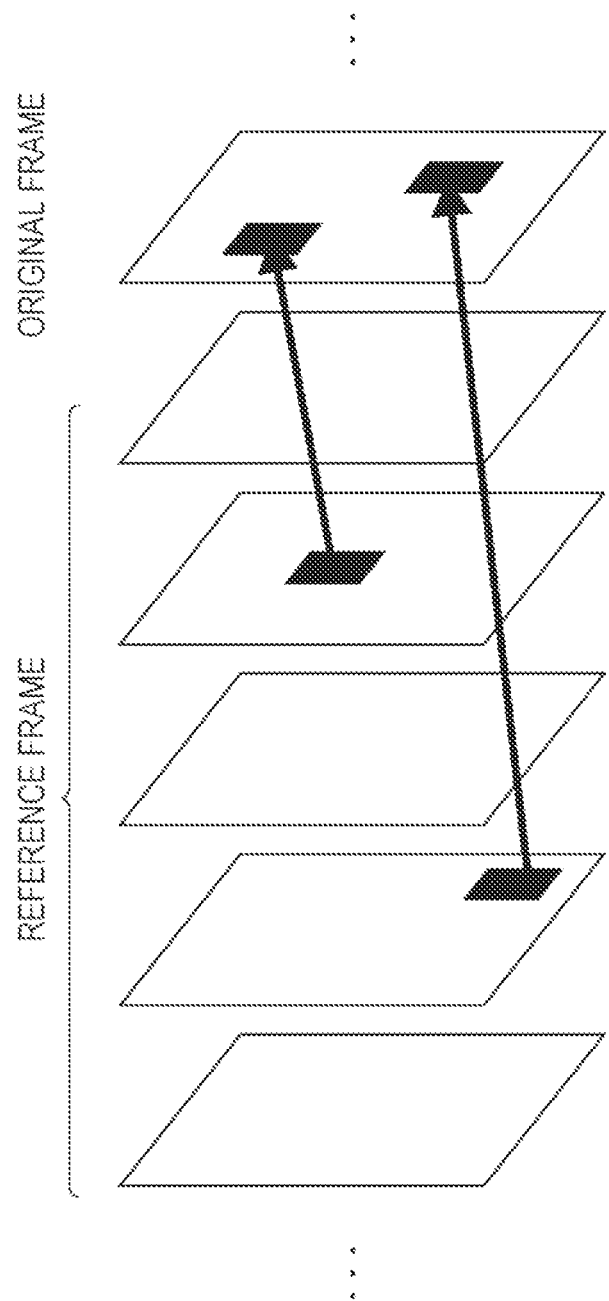
FIG. 5 is a diagram illustrating an example of a multi-reference frame.

The MPEG-2 and the H.263 have performed the motion prediction/compensation process by referring to a single reference frame stored in the frame memory when using P picture whereas, as illustrated in FIG. 5, the AVC has a plurality of reference frames stored in a memory so that a different memory can be referred for each macroblock.

[Direct Mode]

While the enormous amount of motion vector information is involved in employing B picture, the AVC is provided with a mode referred to as a direct mode.

The motion vector information is not stored in the image compression information in the direct mode. The image decoding device calculates the motion vector information of the current block from motion vector information of a neighboring block or motion vector information of a co-located block in the reference frame, the co-located block being located at the same position as the block to be processed.

The direct mode includes a spatial direct mode and a temporal direct mode which can be switched therebetween in every slice.

The spatial direct mode calculates the motion vector information $mv_E$ for the motion compensation block E to be processed as expressed in the following expression (12).

$$mv_E = pmv_E \quad (12)$$

That is, the motion vector information generated by median prediction is applied to the current block.

The temporal direct mode will now be described with reference to FIG. 6.

Figure 6:
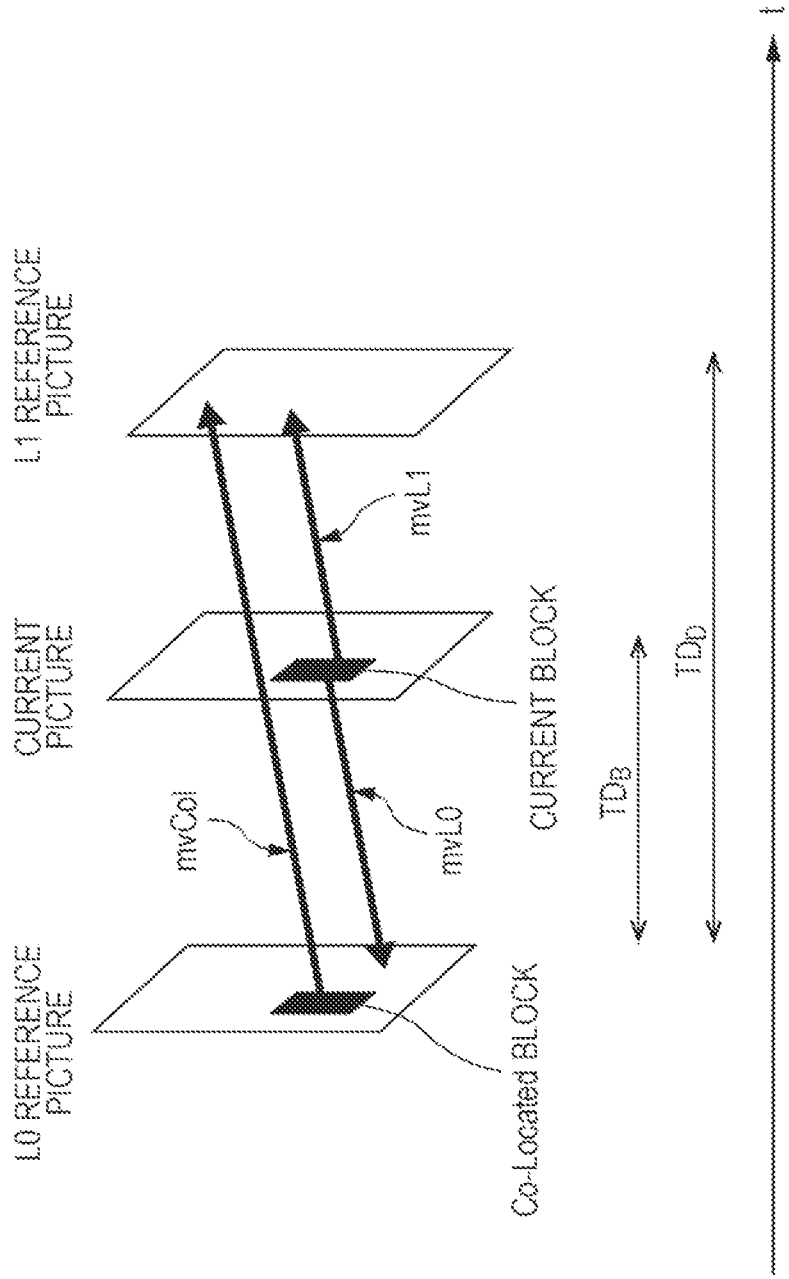
FIG. 6 is a diagram illustrating an example of how a temporal direct mode is performed.
Figure 7:
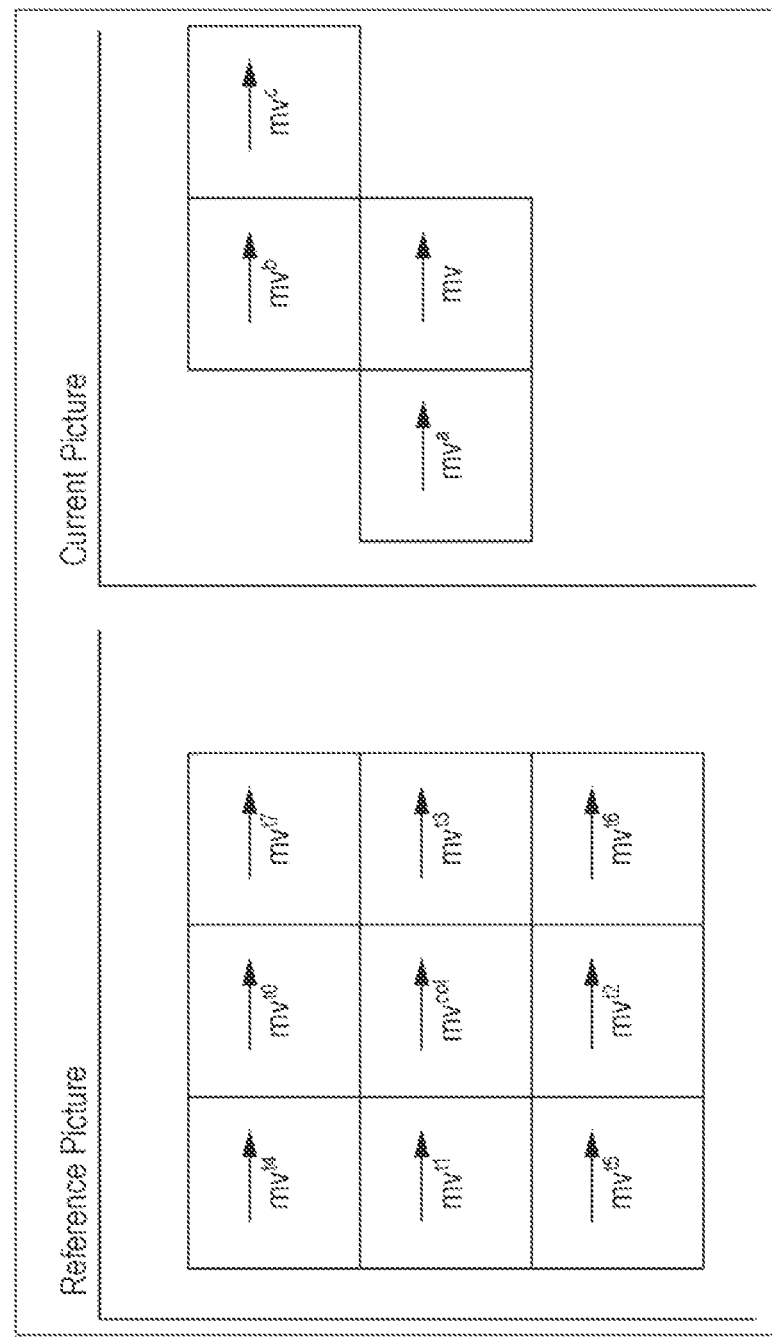
FIG. 7 is a diagram illustrating an example of how a motion vector encoding method is performed.

In FIG. 6, the co-located block in a reference picture L0 is a block located at the same spatial address as the current block, while motion vector information in the co-located block is denoted as $mv_{col}$. A distance between a current picture and the reference picture L0 along a temporal axis is denoted as $TD_B$, while a distance between the reference picture L0 and a reference picture L1 along the temporal axis is denoted as $TD_D$.

Here, motion vector information $mv_{L0}$ for L0 and motion vector information $mv_m$ for L1 in the current picture are calculated by the following expressions (13) and (14).

[Expression 12]

$$mv_{L0} = \frac{TD_B}{TD_D} mv_{col} \quad (13)$$

[Expression 13]

$$mv_{L1} = \frac{TD_D - TD_B}{TD_D} mv_{col} \quad (14)$$

Note that the information TD representing the distance along the temporal axis does not exist in the AVC image compression information, whereby POC (Picture Order Count) is employed to carry out the calculations in the aforementioned expressions (12) and (13).

Moreover, the direct mode in the AVC image compression information can be defined by the macroblock unit of 16×16 pixels or the block unit of 8×8 pixels.

[Selection of Prediction Mode]

It is important in the AVC encoding scheme to select an appropriate prediction mode in order to achieve higher encoding efficiency.

A method implemented in reference software for the H.264/MPEG-4 AVC called a JM (Joint Model) (disclosed in http://iphome.hhi.de/suehring/tml/index.htm) is an example of such selection scheme.

The JM can select between two mode determination methods for a high complexity mode and a low complexity mode to be described hereinafter. Both of the methods calculate a cost function value for each prediction mode and select a prediction mode with the minimum cost function value as an optimal mode for the current sub macroblock or the current macroblock.

The cost function in the high complexity mode is expressed by the following expression (15).

$$\text{Cost}(\text{Mode} \in \Omega) = D + \lambda * R \quad (15)$$

Here, Ω denotes a universal set of candidate modes that encode the current block or macroblock, D denotes energy difference between a decoded image and an input image when encoding is performed in the current prediction mode, λ denotes a Lagrange undetermined multiplier given as a function of a quantization parameter, and R denotes a total code amount including an orthogonal transform coefficient when encoding is performed in the current mode.

This means that the encoding process in the high complexity mode requires more calculation because a provisional encoding process needs to be performed once in all the candidate modes to calculate the parameters D and R.

The cost function in the low complexity mode is expressed by the following expression (16).

$$\text{Cost}(\text{Mode} \in \Omega) = D + \text{QP2Quant}(QP) * \text{HeaderBit} \quad (16)$$

Different from the high complexity mode, D here denotes energy difference between a predictive image and an input image. QP2Quant (QP) is given as a function of a quantization parameter QP while HeaderBit is a code amount related to information pertaining to a header such as the motion vector and a mode, not including the orthogonal transform coefficient.

This means that the low complexity mode requires a prediction process in each candidate mode but not a decoded image, thereby not requiring an encoding process. The low complexity mode can thus be realized with less calculation than the high complexity mode.

[Motion Vector Competition]

Now, Non-Patent Document 1 proposes the following method in order to improve the encoding process of the motion vector using the median prediction as described with reference to FIG. 4.

The method allows any of a "temporal predictor" and a "spatio-temporal predictor" which are to be described below in addition to a "spatial predictor" obtained by the median prediction and defined in the AVC to be adaptively used as the predictive motion vector information.

That is, each of the predictive motion vector information (predictors) is defined by the following expressions (17) to (19) while letting "mvcol" be motion vector information for a co-located block (a block in a reference image, the block having the same x-y coordinates as that of the current block) corresponding to the current block and letting $mv_{tk}$ (k=0 to 8) be motion vector information for the neighboring block.

Temporal Predictor:

[Expression 14]

$$mv_{tm5} = \text{median}\{mv_{col}, mv_{t0}, \ldots, mv_{t3}\} \quad (17)$$

[Expression 15]

$$mv_{tm9} = \text{median}\{mv_{col}, mv_{t0}, \ldots, mv_{t8}\} \quad (18)$$

Spatio-Temporal Predictor:

[Expression 16]

$$mv_{spt} = \text{median}\{mv_{col}, mv_{col}, mv_a, mv_b, mv_c\} \quad (19)$$

The image encoding device 100 calculates a cost function for each block in which each of the predictive motion vector information is used and selects optimal predictive motion vector information. A flag representing information on which of the predictive motion vector information is used in each block is transmitted to the image compression information.

[Coding Unit]

Now, the macroblock size of 16 pixels×16 pixels is not optimal for a large picture frame with UHD (Ultra High Definition; 4000 pixels×2000 pixels) which is to be the target for a next-generation encoding scheme.

Figure 8:
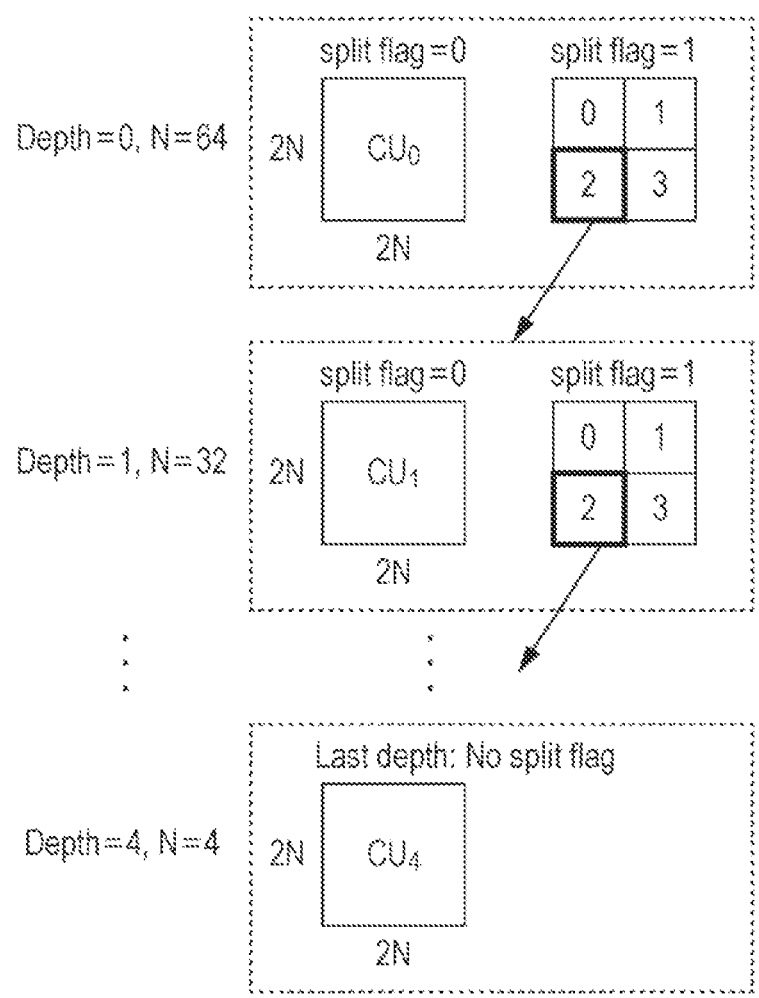
FIG. 8 is a diagram illustrating an example of a configuration of a coding unit.

The AVC specifies the hierarchical structure including the macroblock and the sub macroblock as illustrated in FIG. 3, while HEVC (High Efficiency Video Coding), for example, specifies a coding unit (CU) as illustrated in FIG. 8.

Also referred to as a coding tree block (CTB), the CU is a partial region of an image in a picture unit and plays the similar role to that of the macroblock in the AVC. The latter has the fixed size of 16×16 pixels, whereas the size of the former is unfixed and thus specified in the image compression information in each sequence.

For example, the largest size (LCU (Largest CodingUnit)) and the smallest size (SCU (Smallest Coding Unit)) of the CU are specified in a sequence parameter set (SPS) included in the encoded data to be the output.

Each LCU can be further divided into a smaller CU by setting split_flag=1 within the range not falling below the size of the SCU. In an example illustrated in FIG. 8, the LCU is 128×128 pixels in size while the maximum hierarchical depth is 5. The CU with 2N×2N pixels in size is divided into the CU with N×N pixels in size that is one level lower in the hierarchy when the value of split_flag is "1".

The CU is further divided into a prediction unit (PU) that is a region (a partial region of an image in a picture unit) to be a processing unit for the intra prediction or the inter prediction and then into a transform unit (TU) that is a region (a partial region of an image in a picture unit) to be a processing unit for the orthogonal transform. The HEVC can currently perform the orthogonal transform with 16×16 pixels and 32×32 pixels in addition to 4×4 pixels and 8×8 pixels.

It can be considered that, when the encoding scheme such as the HEVC described above performs a variety of processes by defining the CU and using the CU as a unit, the macroblock in the AVC corresponds to the LCU. The CU however has the hierarchical structure as illustrated in FIG. 8, whereby it is generally the case that the size of the LCU in the uppermost level of the hierarchy, such as 128×128 pixels, is set larger than the size of the macroblock in the AVC.

[Motion Partition Merging]

Figure 9:
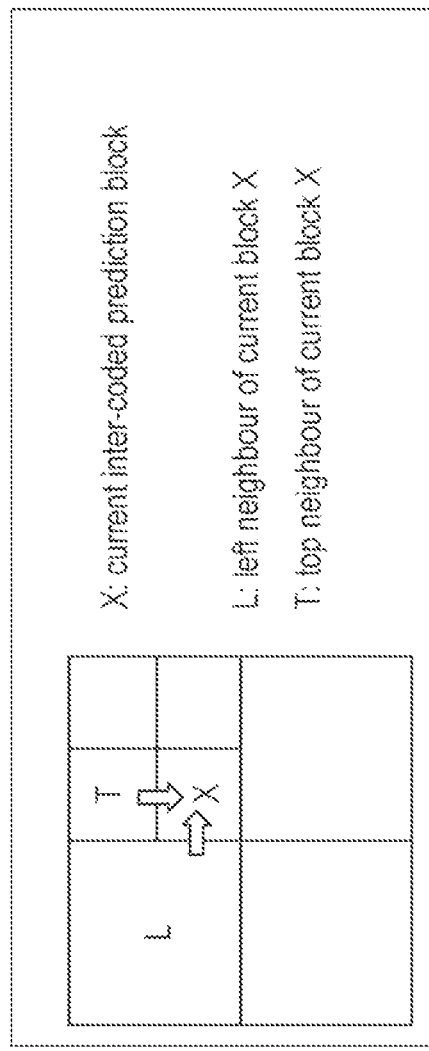
FIG. 9 is a diagram illustrating an example of how Motion Partition Merging is performed.

A method referred to as Motion Partition Merging (merge mode) has been proposed as one of the schemes for encoding the motion information, as illustrated in FIG. 9. In this method, two flags including MergeFlag and MergeLeftFlag are transmitted as merge information relevant to the merge mode. The flag MergeFlag=1 indicates that the motion information of a current region X is identical to the motion information of a neighboring region T adjacent above the current region or a neighboring region L adjacent to the left of the current region. At this time, the merge information being transmitted includes the MergeLeftFlag. The flag MergeFlag=0 indicates that the motion information of the current region X differs from the either motion information of the neighboring region T and the neighboring region L. The motion information of the current region X is transmitted in this case.

The flags MergeFlag=1 and MergeLeftFlag=1 hold true when the motion information of the current region X is identical to the motion information of the neighboring region L. The flags MergeFlag=1 and MergeLeftFlag=0 hold true when the motion information of the current region X is identical to the motion information of the neighboring region T.

[Slicing in AVC]

The image encoding schemes such as the MPEG-2 and the AVC can divide a single picture into a plurality of slices and process each slice in parallel.

Figure 10:
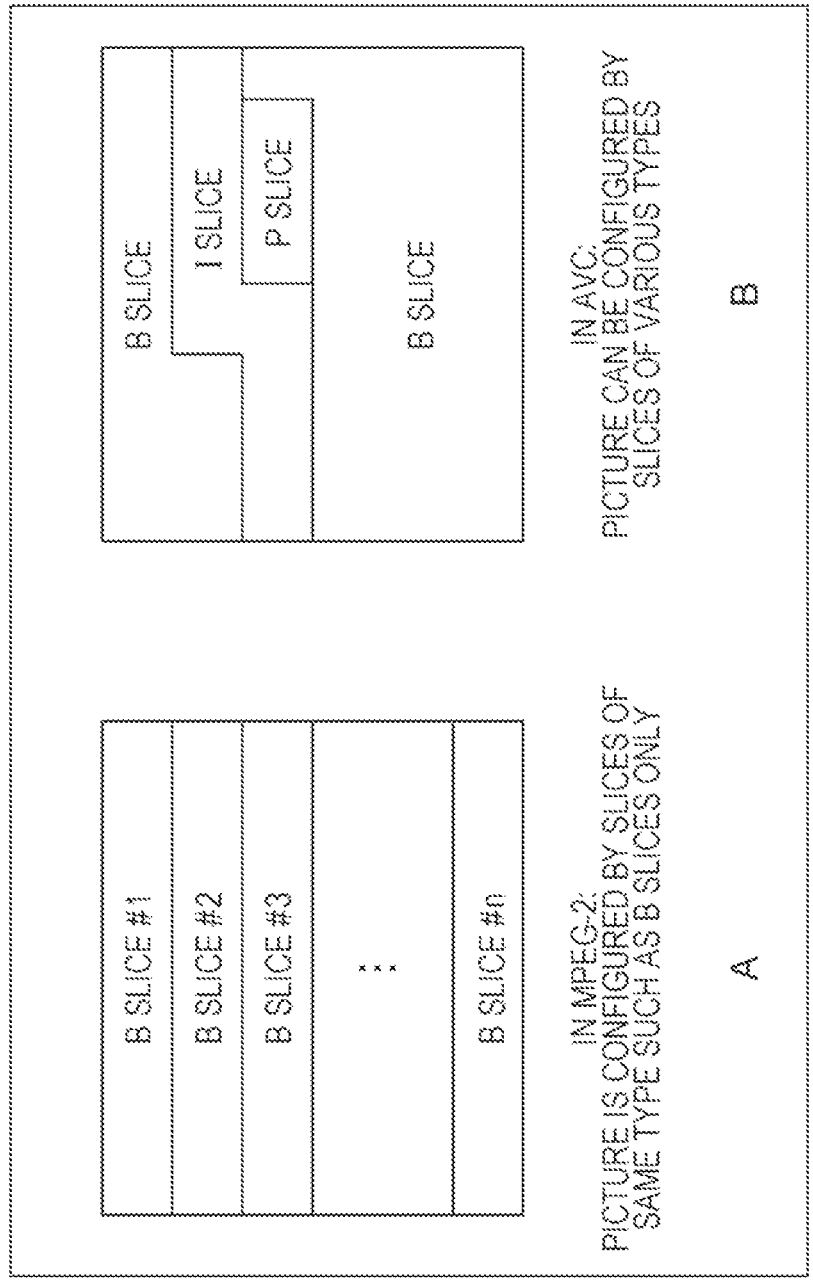
FIG. 10 is a diagram illustrating an example of slice division.

As illustrated in a case A in FIG. 10, the MPEG-2 employs a slice having the maximum size equal to one macroblock line and requires that every slice configuring the B picture be a B slice.

On the other hand, as illustrated in a case B in FIG. 10, the AVC may employ a slice having the size larger than one macroblock line, and a slice boundary need not be at the right edge (right edge of the picture) of the macroblock line. Moreover, a single picture may be configured by slices of different types.

Figures 11, 12:
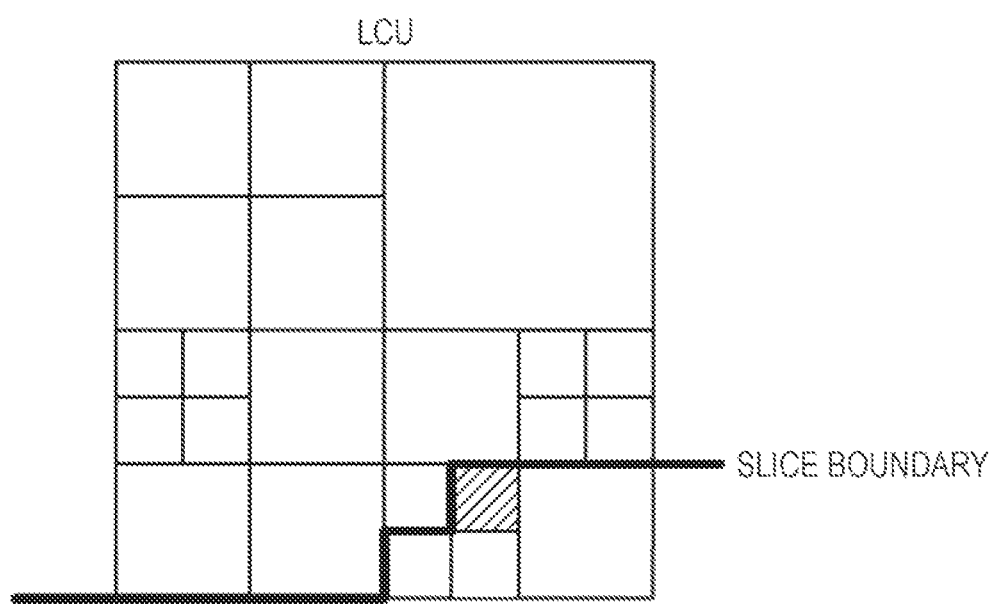
FIG. 11 is a diagram illustrating an example of a slice type.
FIG. 12 is a diagram illustrating an example of a slice boundary.

The AVC specifies the slice type as illustrated in FIG. 11, for example.

Note that the AVC can carry out the deblocking filter process across the slice boundary. The process such as the intra prediction, CABAC, CAVLC, or motion vector prediction that uses neighboring information cannot however be carried out across the slice boundary.

In other words, the encoding process for each slice can be carried out independently from each other, whereby a single picture can be divided into the plurality of slices so that each slice can be encoded in parallel. Such slice division can therefore reduce the time required for performing the encoding process (or speed up the encoding process).

[Slice Boundary]

The slice is partitioned by the unit of macroblock in the AVC. That is, a slice boundary being the boundary between adjacent slices corresponds with any macroblock boundary (the boundary between adjacent macroblocks). Put in another way, a slice includes a plurality of macroblocks.

In the HEVC, on the other hand, the slice can be partitioned within the LCU. This means that the slice is partitioned by the unit of not the LCU but the CU. A slice boundary therefore corresponds with any CU boundary (the boundary between adjacent CUs). The size of the CU is set at will.

FIG. 12 illustrates an example of the slice boundary. The largest quadrangle illustrated in FIG. 12 represents the LCU, the quadrangle within which represents the CU configured in the LCU. A thick line represents the slice boundary. In the example illustrated in FIG. 12, the slice is partitioned between the CUs that are in the LCU. The shape of the slice boundary becomes complex as a control unit of the slice boundary becomes small.

The present technique is adapted such that the motion vector encoding unit 122 selects a new candidate (an available candidate) in place of an unavailable neighboring region in order to not have the decreased number of candidates available for the MV competition or the merge mode, in case where the neighboring region is located in another slice or is not present when the current region to be processed is adjacent to the slice boundary.

[Candidate Selection Control in MV Competition]

The candidate selection control for the slice boundary performed in the MV competition will be described with reference to FIG. 13.

Figure 13:
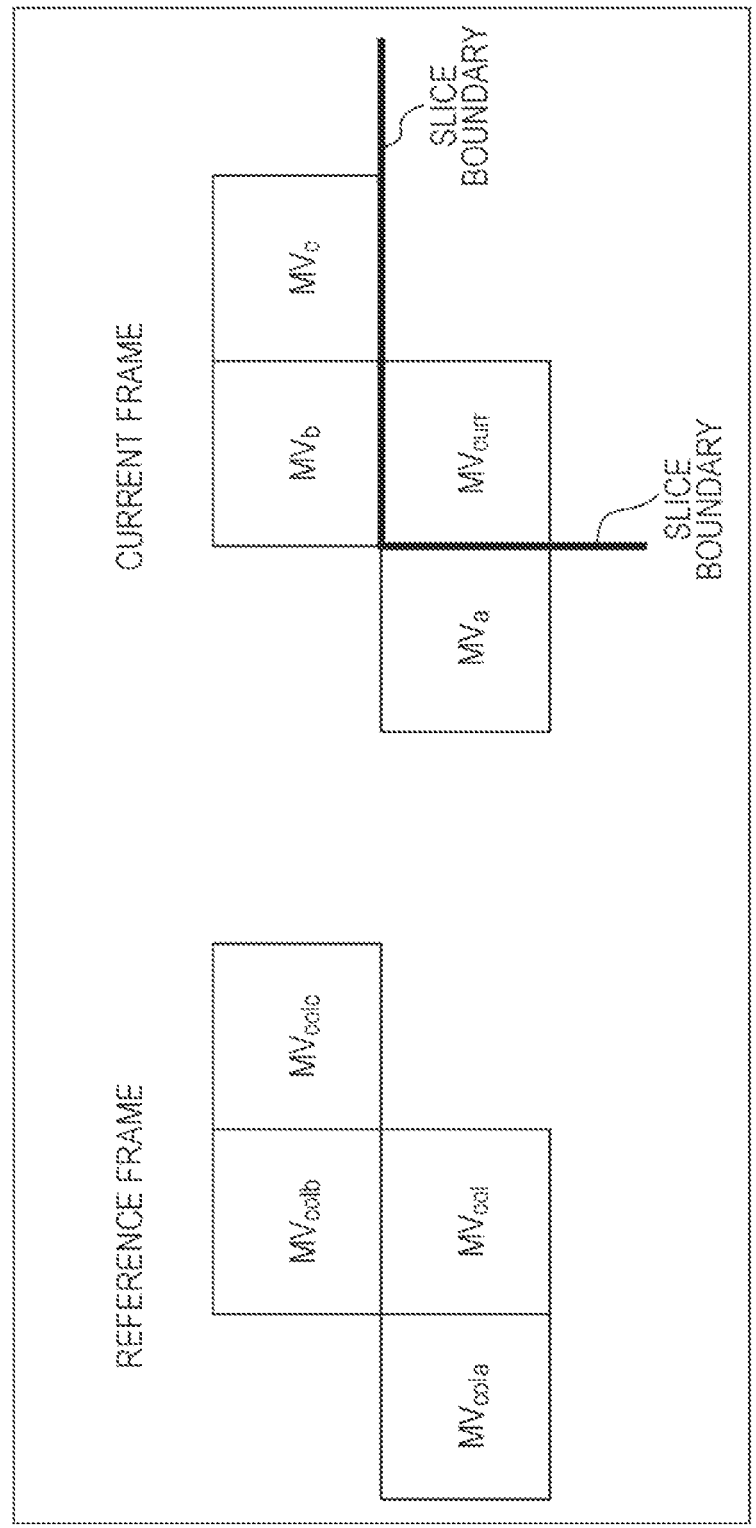
FIG. 13 is a diagram illustrating an example of a process in MV competition performed on a slice edge.

Each quadrangle in FIG. 13 represents a region (such as a CU or a sub macroblock) to be the unit of the prediction process.

The right side of FIG. 13 illustrates an example of the region of a current frame to be processed. The quadrangle indicated by $MV_{curr}$ represents the current region to be processed where $MV_{curr}$ represents a motion vector for the current region. The quadrangle indicated by $MV_{curr}$ represents a neighboring region A adjacent to the left of the current region where $MV_a$ represents a motion vector for the neighboring region A.

The quadrangle indicated by $MV_b$ represents a neighboring region B adjacent above the current region where $MV_b$ represents a motion vector for the neighboring region B. The quadrangle indicated by $MV_c$ represents a neighboring region C adjacent to the upper right of the current region where $MV_c$ represents a motion vector for the neighboring region C.

Moreover, the left side of FIG. 13 illustrates an example of the region of a reference frame to which the current region refers. The quadrangle indicated by $MV_{col}$ represents a co-located region located at the same position as the current region (that is, a temporal neighboring region col for the current region) where $MV_{col}$ represents a motion vector for the co-located region. The quadrangle indicated by $MV_{cola}$ represents a co-located region located at the same position as the neighboring region A where $MV_{cola}$ represents a motion vector for the co-located region.

The quadrangle indicated by $MV_{colb}$ represents a co-located region located at the same position as the neighboring region B where $MV_{colb}$ represents a motion vector for the co-located region. The quadrangle indicated by $MV_{colc}$, represents a co-located region located at the same position as the neighboring region C where $MV_{colc}$, represents a motion vector for the co-located region.

$MV_a$, $MV_b$, $MV_c$, and $MV_{col}$ are the candidates for the predictive motion vector information of the current region when the current region is not in contact with the slice boundary.

When the neighboring regions A to C are located outside the current slice (the slice to be processed including the current region to be processed) as illustrated in the example in FIG. 13, however, the motion vectors ($MV_a$, $MV_b$, and $MV_c$) for the neighboring regions become unavailable and are excluded from the candidates for the predictive motion vector information. The number of candidates decreases as a result, thereby causing the accuracy of predicting the predictive motion vector information to drop and possibly decreasing the encoding efficiency of the motion information of the current region.

While FIG. 13 illustrates the example where all the neighboring regions A to C are located outside the current slice ($MV_a$, $MV_b$, and $MV_c$ are all unavailable), there can be a case where some of $MV_a$, $MV_b$, and $MV_c$ are unavailable depending on the way the slice boundary is present.

For example, there can be considered a case where: only the neighboring region A is located outside the current slice (only $MV_a$ is unavailable); only the neighboring region B is located outside the current slice (only $MV_b$ is unavailable); only the neighboring region C is located outside the current slice (only $MV_c$ is unavailable); the neighboring regions A and B are located outside the current slice ($MV_a$ and $MV_b$ are unavailable); the neighboring regions A and C are located outside the current slice ($MV_a$ and $MV_b$ are unavailable); and the neighboring regions B and C are located outside the current slice ($MV_b$ and $MV_c$ are unavailable).

Either case results in the decreased number of candidates for the predictive motion vector information, thereby causing the accuracy of predicting the predictive motion vector information to drop and possibly decreasing the encoding efficiency for the motion information of the current region.

Now, the motion vector encoding unit 122 selects the available motion information of another neighboring region as the candidate for the predictive motion vector information in place of the unavailable motion information of a neighboring region that is the candidate for the predictive motion vector information.

The motion vector encoding unit selects the motion information of a co-located region for the region as the candidate in place of the unavailable motion information of the region, for example. Generally, each region in the reference frame has already been processed at the time the current frame is processed. This means that the motion information of each region in the reference frame is available. The motion vector encoding unit 122 accordingly selects the motion information of the co-located region, which has high correlation with the unavailable motion information, as the substitute candidate in order to not drop the prediction accuracy as much as possible.

When $MV_a$ is unavailable because the neighboring region A is located outside the current slice, for example, the motion vector encoding unit 122 selects $MV_{cola}$ that is available and provided for the co-located region corresponding to the neighboring region A as the candidate for the predictive motion vector information in place of $MV_a$.

When $MV_b$ is unavailable because the neighboring region B is located outside the current slice, for example, the motion vector encoding unit 122 selects $MV_{colb}$ that is available and provided for the co-located region corresponding to the neighboring region B as the candidate for the predictive motion vector information in place of $MV_b$.

When $MV_c$ is unavailable because the neighboring region C is located outside the current slice, for example, the motion vector encoding unit 122 selects $MV_{colc}$ that is available and provided for the co-located region corresponding to the neighboring region C as the candidate for the predictive motion vector information in place of $MV_c$.

As a result, the motion vector encoding unit 122 can perform the MV competition without having the decreased number of candidates for the predictive motion vector information. The image encoding device 100 can therefore suppress the drop in the encoding efficiency at the slice boundary.

Figure 14:
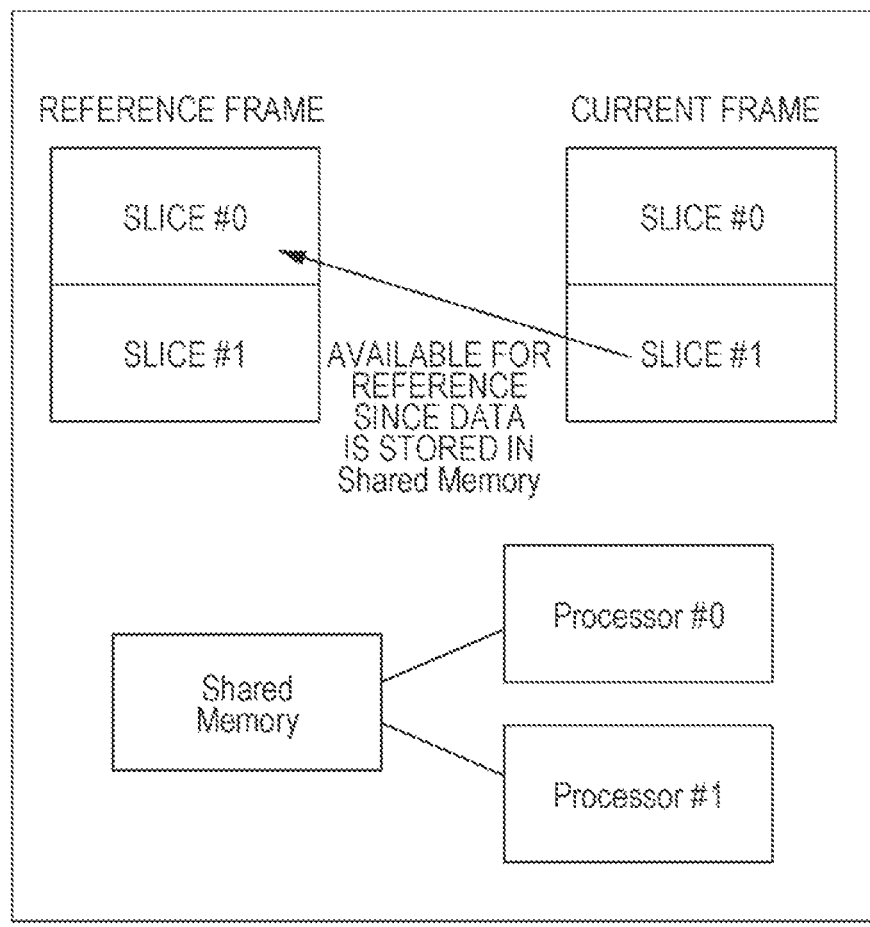
FIG. 14 is a diagram illustrating an example of parallel processing.

Note that even when a plurality of processors is used where each of the plurality of slices is processed by a different processor as illustrated in FIG. 14, data in each slice that has been processed is stored in a shared memory (a mutually identical memory space) and can therefore be referred from any of the processors. Accordingly, as described above, the motion information in the reference frame can be used with no problem in such case as well.

It is concerned, for example, that the parallel processing between the slices is performed with more difficulty, causing an unnecessary delay and an increase in a processing time when the encoding device waits for the candidate motion information to be obtained without replacing the candidate. Furthermore, in replacing the motion information by the motion information of a neighboring region that has been processed and is located outside the current slice of the current frame where each slice is processed by a different processor as illustrated in an example in FIG. 14, it is possible that the replaced motion information is still stored in a memory region exclusive to each processor, thereby making it difficult for another processor to refer to the motion information.

The image encoding device 100 can suppress the drop in the encoding efficiency at the slice boundary with no such concern by using the motion information of the reference frame (a frame processed before the current frame is processed) different from the current frame, as described above.

Note that in the aforementioned description, the motion information provided in place of the unavailable motion information may be selected from a region other than the co-located region corresponding to the neighboring region. It is certainly desired that the substitute motion information have higher correlation with the original motion information. The motion information can however be a substitute candidate as long as it is available at least. The motion information of a region other than the co-located region in the reference frame may be used, for example. Alternatively, the motion information of a frame that has been processed other than the reference frame and the current frame may be used as well.

The motion information that has been processed in the current frame may be used. Furthermore, the motion information that has been processed within the current slice may be used in order to avoid the aforementioned concerns that arise when the plurality of processors is used.

Figure 15:
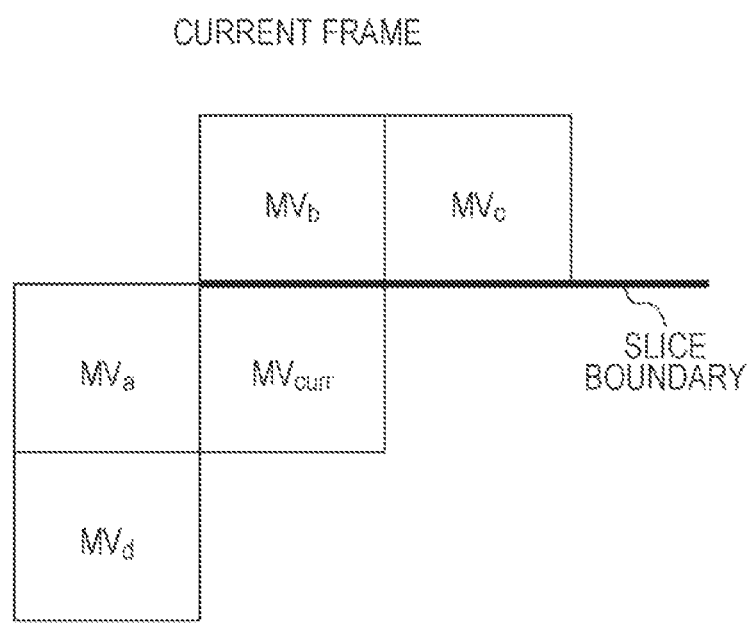
FIG. 15 is a diagram illustrating another example of the process in the MV competition performed on the slice edge.

As illustrated in an example in FIG. 15, $MV_d$ that has been processed and is available in the neighboring region within the current slice may be used in place of $MV_b$ that is unavailable.

Note that the region (neighboring region) with the motion information to be the candidate for the predictive motion vector information need not be (spatially or temporally) adjacent to the current region. A region (not shown) adjacent to the left of the neighboring region A may be the neighboring region (that is, the motion information in that region may be the candidate for the predictive motion vector information), for example. It is generally the case however that the farther the region from the current region, the lower the correlation with the motion information of the current region. It is thus desired that the motion information of a region closer to the current region be the candidate for the predictive motion vector information.

The aforementioned slice boundary includes the picture frame. This means the motion information of the neighboring region to be the candidate for the predictive motion vector information can possibly be unavailable when the current region is located at an upper end or a left end of the picture (frame). The motion information that is available may be the substitute candidate in this case as well.

Figure 16:
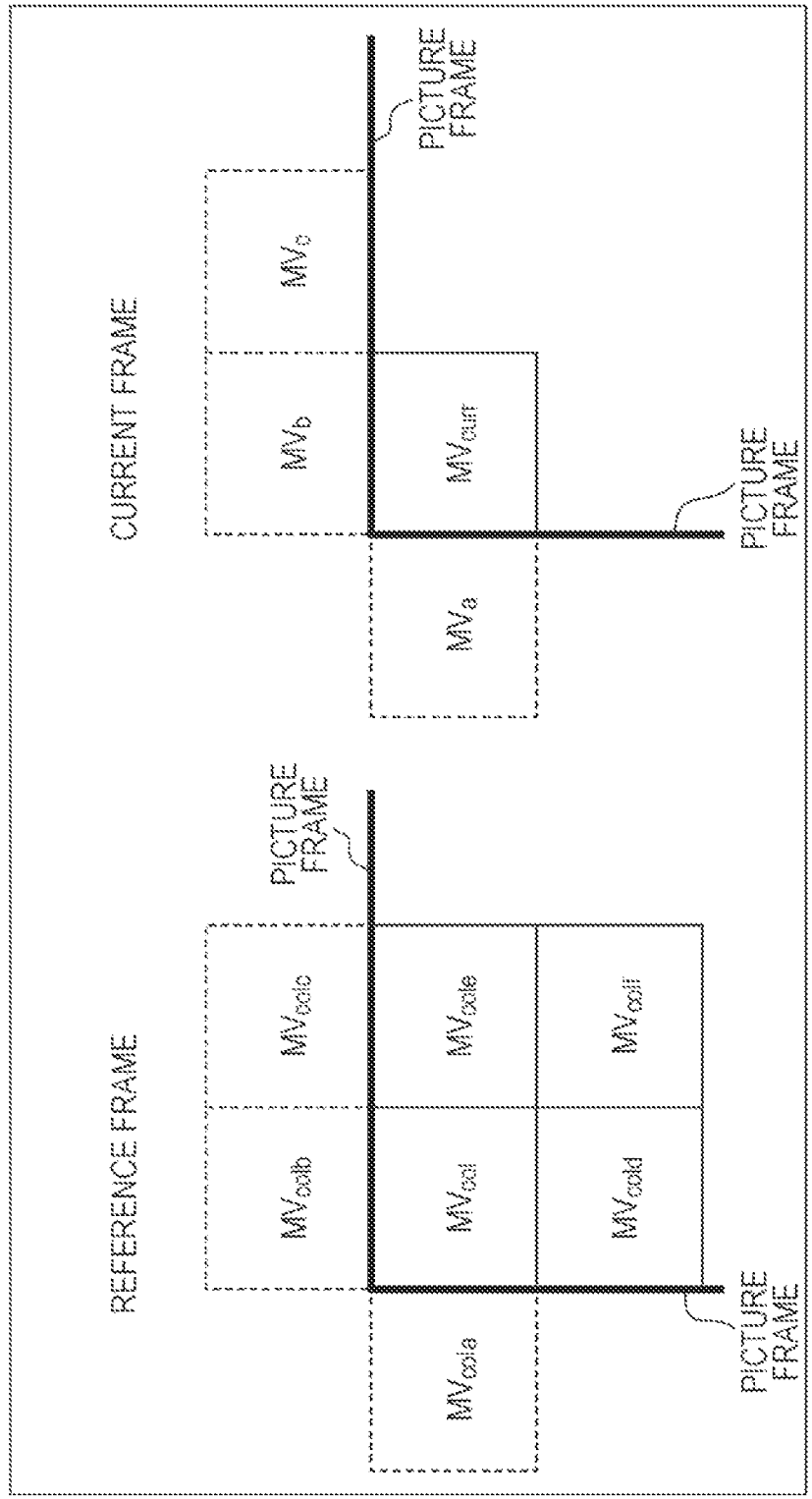
FIG. 16 is a diagram illustrating an example of a process in the MV competition performed on a picture edge.

However, when a neighboring region does not exist in the current frame, a co-located region corresponding to the neighboring region does not exist either in the case where the slice boundary corresponds with the picture frame as illustrated in FIG. 16. In the example illustrated in FIG. 16, the neighboring regions A to C are all located outside the picture frame and do not exist in the current frame. In this case, the co-located regions corresponding to the neighboring regions are also located outside the picture frame and do not exist in the reference frame. That is, $MV_a$, $MV_b$, and $MV_c$ are all unavailable while at the same time $MV_{cola}$, $MV_{colb}$, and $MV_{colc}$ are all unavailable.

In this case, for example, the motion information that is available in the reference frame such as $MV_{cold}$, $MV_{cole}$, and $MV_{colf}$ may be used as the substitute candidate. The motion information that is available in a frame other than the reference frame may certainly be used as well. Although it is at will as to which available motion information is used, it is desired that the motion information of a region closer to the current region be used as described above.

[Candidate Selection Control in Merge Mode]

Such method of substituting the candidate can also be applied to the selection of a candidate region to be merged with the current region in the merge mode.

Figure 17:
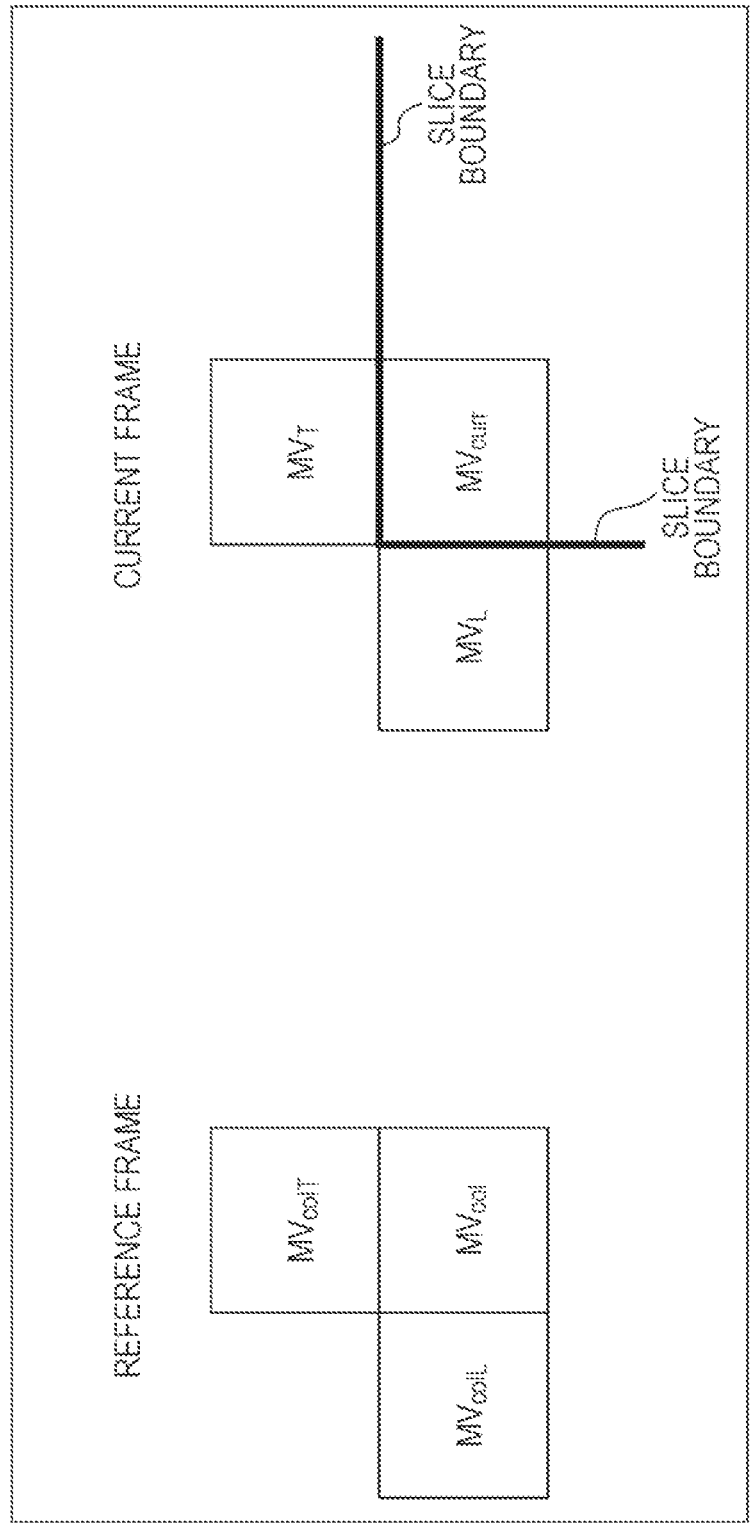
FIG. 17 is a diagram illustrating an example of a process in a merge mode performed on a slice edge.
Figure 18:
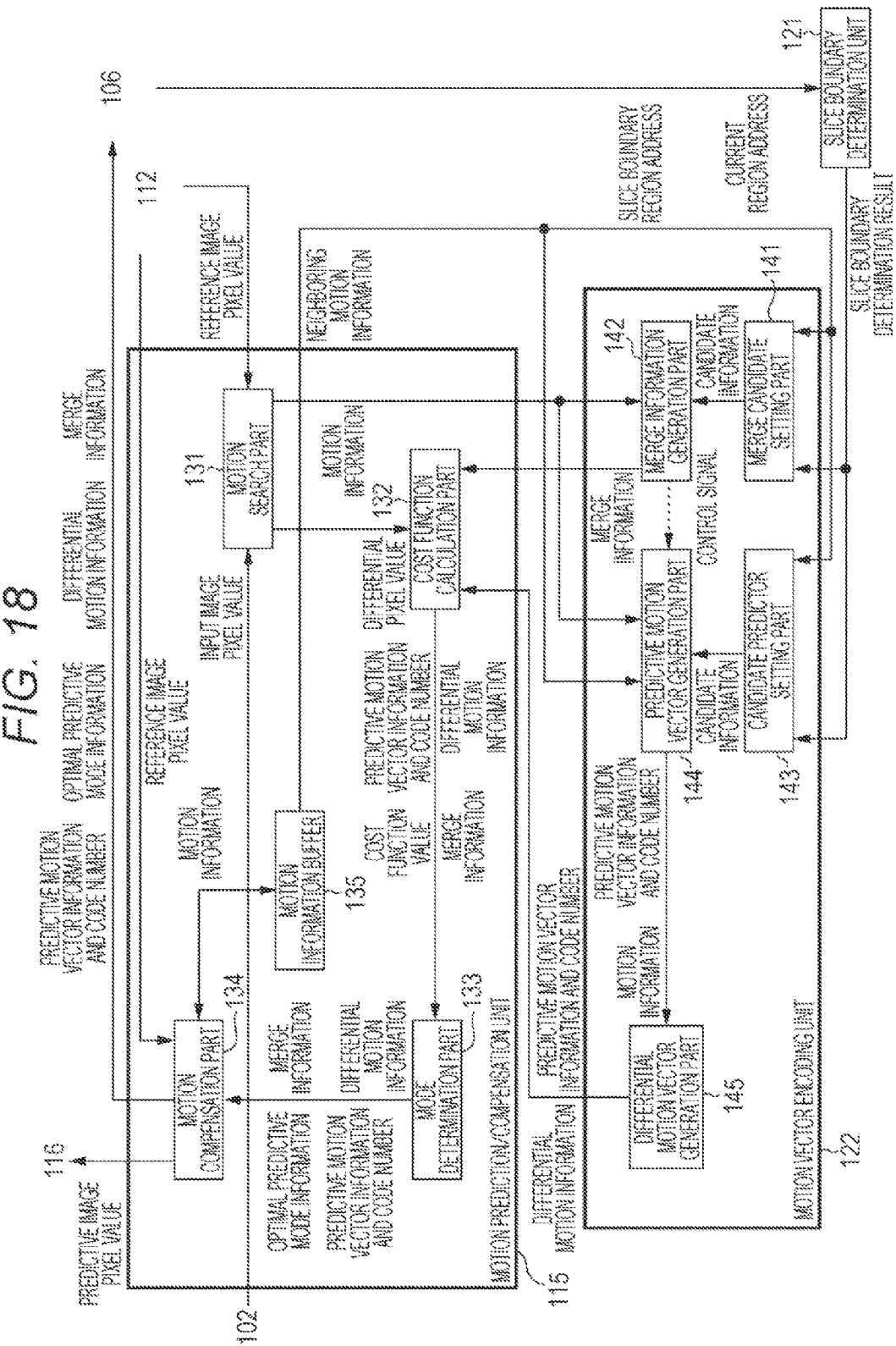
FIG. 18 is a block diagram illustrating an example of a main configuration of a motion prediction/compensation unit, a slice boundary determination unit, and a motion vector encoding unit.

In the merge mode, as illustrated in FIG. 18, a neighboring region L adjacent to the left of the current region and a region T adjacent above the current region are the candidate regions (hereinafter also referred to as a merge candidate) to be merged with the current region. Each quadrangle in FIG. 17 represents a region (such as a CU or a sub macroblock) to be the unit of the prediction process.

The right side of FIG. 17 illustrates an example of the region of a current frame to be processed. The quadrangle indicated by $MV_{curr}$ represents the current region to be processed where $MV_{curr}$ represents a motion vector for the current region. The quadrangle indicated by $MV_L$ represents the neighboring region L adjacent to the left of the current region where $MV_L$ represents a motion vector for the neighboring region L.

The quadrangle indicated by $MV_T$ represents the neighboring region T adjacent above the current region where $MV_T$ represents a motion vector for the neighboring region T.

Moreover, the left side of FIG. 17 illustrates an example of the region of the reference frame to which the current region refers. The quadrangle indicated by $MV_{col}$ represents a co-located region located at the same position as the current region (that is, a temporal neighboring region col for the current region) where $MV_{col}$ represents a motion vector for the co-located region. The quadrangle indicated by $MV_{colL}$ represents a co-located region located at the same position as the neighboring region L where $MV_{colL}$ represents a motion vector for the co-located region.

The quadrangle indicated by $MV_{colT}$ represents a co-located region located at the same position as the neighboring region T where $MV_{colT}$ represents a motion vector for the co-located region.

The merge mode is similar to the aforementioned MV competition in that, when the neighboring regions L and T are located outside the current slice (the slice to be processed including the current region to be processed) as illustrated in the example in FIG. 17, the motion vectors ($MV_L$ and $MV_T$) for the neighboring regions become unavailable and are excluded from the merge candidate. The number of merge candidates decreases as a result, thereby making it less likely for the merge mode to be selected and possibly decreasing the encoding efficiency for the motion information of the current region.

While FIG. 17 illustrates the example where both of the neighboring regions L and T are located outside the current slice ($MV_L$ and $MV_T$ are both unavailable), there can be a case where either one of $MV_L$ and $MV_T$ becomes unavailable depending on the way the slice boundary is present. Such case as well results in the decreased number of merge candidates, thereby making it less likely for the merge mode to be selected and possibly decreasing the encoding efficiency for the motion information of the current region.

Now, as is the case with the aforementioned MV competition, the motion vector encoding unit 122 selects another neighboring region that is available as the merge candidate and uses the motion information of the region in place of the unavailable motion information of a neighboring region that is the merge candidate.

The motion vector encoding unit selects the motion information, which has high correlation with the motion information of the region, of a co-located region corresponding to the region as the candidate in place of the unavailable motion information of the region, for example.

When $MV_L$ is unavailable because the neighboring region L is located outside the current slice, for example, the motion vector encoding unit 122 selects $MV_{colL}$ that is available and provided for the co-located region corresponding to the neighboring region L as the candidate for the predictive motion vector information in place of $MV_L$.

When $MV_T$ is unavailable because the neighboring region T is located outside the current slice, for example, the motion vector encoding unit 122 selects $MV_{colT}$ that is available and provided for the co-located region corresponding to the neighboring region T as the candidate for the predictive motion vector information in place of $MV_T$.

As a result, the motion vector encoding unit 122 can determine whether or not to select the merge mode without having the decreased number of merge candidates. The image encoding device 100 can therefore suppress the drop in the encoding efficiency at the slice boundary.

As is the case with the aforementioned MV competition, the merge mode can select the co-located region corresponding to the region with the unavailable motion information as the substitute merge candidate. This means that the region can be the substitute merge candidate as long as the region has the available motion information at least.

[Motion Prediction/Compensation Unit, Slice Boundary Determination Unit, and Motion Vector Encoding Unit]

FIG. 18 is a block diagram illustrating an example of a main configuration of the motion prediction/compensation unit 115, the slice boundary determination unit 121, and the motion vector encoding unit 122.

As illustrated in FIG. 18, the motion prediction/compensation unit 115 includes a motion search part 131, a cost function calculation part 132, a mode determination part 133, a motion compensation part 134, and a motion information buffer 135.

The motion vector encoding unit 122 includes a merge candidate setting part 141, a merge information generation part 142, a candidate predictor setting part 143, a predictive motion vector generation part 144, and a differential motion vector generation part 145.

An input image pixel value from the picture rearrangement buffer 102 as well as a reference image pixel value from the frame memory 112 are input to the motion search part 131. The motion search part 131 then performs a motion search process on all the inter prediction modes to generate motion information which includes a motion vector and a reference index. The motion search part 131 thereafter supplies the motion information to the merge information generation part 142 and the predictive motion vector generation part 144 in the motion vector encoding unit 122.

The lossless encoding unit 106 supplies, to the slice boundary determination unit 121, a slice boundary region address and a current region address which are included in information such as a sequence parameter set, a picture parameter set, and a slice header, the slice boundary region address indicating the position of the slice boundary by an address (identification information) of a region (such as a CU or a sub macroblock) to be the processing unit, and the current region address indicating the position of the current region to be processed.

On the basis of these pieces of information and the positional relationship between the current region and the slice boundary, the slice boundary determination unit 121 determines whether or not there exists a region with the motion information to be a candidate for the motion prediction vector information of the current region or a region to be a merge candidate within the current slice (or whether or not the motion information is available). The slice boundary determination unit 121 then supplies the determination result (slice boundary determination result) to the merge candidate setting part 141 and the candidate predictor setting part 143 in the motion vector encoding unit 122.

Upon acquiring the slice boundary determination result from the slice boundary determination unit 121, the merge candidate setting part 141 in the motion vector encoding unit 122 determines a neighboring region to be the merge candidate according to the slice boundary determination result. The merge candidate setting part 141 determines a neighboring region which can acquire neighboring motion information from the motion information buffer 135 to be the available motion information. For example, when the slice determination boundary determination result has determined that there exists a region with unavailable motion information among the merge candidates, the merge candidate setting part 141 determines the neighboring region which can acquire the neighboring motion information from the motion information buffer 135 as the merge candidate in place of the region with the unavailable motion information. Once the merge candidate has been determined, the merge candidate setting part 141 supplies to the merge information generation part 142 candidate information including information that specifies the neighboring region determined to be the candidate and the motion information (neighboring motion information) of the neighboring region.

The merge information generation part 142 acquires the motion information of the current region from the motion search part 131, compares the motion information with the neighboring vocabulary information included in the candidate information supplied from the merge candidate setting part 141, determines whether or not to merge the neighboring region with the current region, and further determines which candidate to merge when it is determined to merge the neighboring region with the current region. As deemed appropriate, the merge information generation part 142 generates the flags MergeFlag and MergeLeftFlag indicating the determination results and merge information including these flag information. The merge information generation part 142 then supplies the generated merge information to the cost function calculation part 132. In the case where the merge mode has not been selected since the motion information of the current region does not match the neighboring motion information, the merge information generation part 142 supplies a control signal to the predictive motion vector generation part 144, which is instructed by the signal to generate a predictive motion vector.

When the merge mode has not been selected, the candidate predictor setting part 143 acquires the slice boundary determination result from the slice boundary determination unit 121 and determines the motion information to be the candidate for the predictive motion vector information according to the slice determination boundary determination result. The candidate predictor setting part 143 determines a neighboring region that can acquire the neighboring motion information from the motion information buffer 135 to be the available motion information. For example, when the slice determination boundary determination result has determined that there is a region with unavailable motion information among the candidates for the predictive motion vector information, the candidate predictor setting part 143 determines the neighboring motion information that can be acquired from the motion information buffer 135 to be the substitute candidate. Once the candidate has been determined, the candidate predictor setting part 143 supplies the candidate information including the neighboring motion information determined to be the candidate to the predictive motion vector generation part 144.

The predictive motion vector generation part 144 acquires the motion information of the current region in each inter prediction mode from the motion search part 131 according to the control signal supplied from the merge information generation part 142, and acquires the candidate information from the candidate predictor setting part 143. The predictive motion vector generation part 144 uses these pieces of information to generate a plurality of pieces of predictive motion vector information to be a candidate. The predictive motion vector information is generated by an arbitrary method, which may be a method described in Non-Patent Document 2, for example.

Subsequently, the predictive motion vector generation part 144 supplies, to the differential motion vector generation part 145, the motion information of the current region, each of the generated predictive motion vector information to be the candidate, and a code number assigned to each of the predictive motion vector information.

The differential motion vector generation part 145 selects the optimal candidate from the supplied predictive motion vector information for each inter prediction mode and generates differential motion vector information including a differential value between the motion information and the predictive motion vector information. The differential motion vector generation part 145 supplies the generated differential motion vector information in each inter prediction mode, the selected predictive motion vector information for each inter prediction mode, and a code number assigned to the predictive motion vector information, to the cost function calculation part 132 in the motion prediction/compensation unit 115.

The motion search part 131 also uses the searched motion vector information to perform a compensation process on the reference image and generate a predictive image. In addition, the motion search part 131 calculates a difference (a differential pixel value) between the predictive image and the input image and supplies the differential pixel value to the cost function calculation part 132.

The cost function calculation part 132 uses the differential pixel value supplied from the motion search part 131 for each inter prediction mode to calculate a cost function value in each inter prediction mode. The cost function calculation part 132 then supplies the cost function value calculated for each inter prediction mode and the merge information to the mode determination part 133. As needed, the cost function calculation part 132 also supplies the differential motion information for each inter prediction mode, the predictive motion vector information for each inter prediction mode, and the code number assigned to the predictive motion vector information to the mode determination part 133.

The mode determination part 133 determines which of the inter prediction modes is optimal for use by using the cost function value for each inter prediction mode and determines the inter prediction mode with the smallest cost function value to be the optimal prediction mode. The mode determination part 133 then supplies optimal prediction mode information that is the information on the optimal prediction mode and the merge information to the motion compensation part 134. As needed, the mode determination part 133 also supplies to the motion compensation part 134 the differential motion information, the predictive motion vector information, and the code number assigned to the predictive motion vector information in the inter prediction mode that has been selected as the optimal prediction mode.

The motion compensation part 134 obtains a motion vector in the optimal prediction mode by using the information supplied. When the merge mode has been selected, for example, the motion compensation part 134 acquires the motion information of the neighboring region specified by the merge information from the motion information buffer 135 and determines the motion vector to be the motion vector in the optimal prediction mode. When the merge mode has not been selected, the motion compensation part 134 uses the differential motion information and the predictive motion vector information supplied from the mode determination part 133 to generate the motion vector in the optimal prediction mode. The motion compensation part 134 generates the predictive image in the optimal prediction mode by using the motion vector and performing compensation on the reference image from the frame memory 112.

The predictive image selection unit 116 supplies a signal indicating that the inter prediction has been selected by the predictive image selection unit 116, when the inter prediction has been selected. In response, the motion compensation part 134 supplies the optimal prediction mode information and the merge information to the lossless encoding unit 106. As needed, the motion compensation part 134 also supplies the differential motion vector information and the code number of the predictive motion vector information in the optimal prediction mode to the lossless encoding unit 106.

The motion compensation part 134 further stores the motion information in the optimal prediction mode into the motion information buffer 135. Note that 0 vector as the motion vector information is stored in the motion information buffer 135 when the inter prediction has not been selected by the predictive image selection unit 116 (meaning that an intra predictive image has been selected).

The motion information buffer 135 stores the motion information of the region processed in the past in the optimal prediction mode. The stored motion information is supplied to each part as neighboring motion information in the process performed on the region that is processed temporally after the region corresponding to the stored motion information.

As described above, the motion vector encoding unit 122 determines the candidate for the predictive motion vector information and the merge candidate on the basis of the slice boundary determination result from the slice boundary determination unit 121. The motion vector encoding unit 122 can therefore suppress the decrease in the number of candidates in the MV competition and the merge mode. The image encoding device 100 can improve the encoding efficiency as a result.

[Encoding Process Flow]

Each process flow performed by the aforementioned image encoding device 100 will now be described. First, an example of the flow of the encoding process will be described with reference to a flowchart illustrated in FIG. 19.

The A/D conversion unit 101 performs A/D conversion on an input image in step S101. In step S102, the picture rearrangement buffer 102 stores the A/D-converted image and rearranges the order of each picture from the order of display to the order of encoding.

In step S103, the intra prediction unit 114 performs an intra prediction process in the intra prediction mode. In step S104, the motion prediction/compensation unit 115 performs an inter motion prediction process which performs motion prediction or motion compensation in the inter prediction mode.

In step S105, the predictive image selection unit 116 determines the optimal mode on the basis of each cost function value output from the intra prediction unit 114 and the motion prediction/compensation unit 115. That is, the predictive image selection unit 116 selects either one of the predictive image generated by the intra prediction unit 114 or the predictive image generated by the motion prediction/compensation unit 115.

In step S106, the calculator 103 calculates the difference between the image rearranged in the process performed in step S102 and the predictive image selected by the process performed in step S105. The differential data has reduced data amount compared to the original image data. The data amount can therefore be compressed as compared to when the image is encoded as is.

In step S107, the orthogonal transform unit 104 performs an orthogonal transform on the differential information generated by the process performed in step S106. Specifically, the orthogonal transform such as the discrete cosine transform or the Karhunen-Loeve transform is performed so that a transform coefficient is output.

In step S108, the quantization unit 105 quantizes the orthogonal transform coefficient obtained by the process performed in step S107.

The differential information quantized by the process performed in step S108 is decoded locally as follows. That is, in step S109, the dequantization unit 108 dequantizes the orthogonal transform coefficient (also referred to as a quantized coefficient) that is quantized and generated by the process performed in step S108 by a characteristic corresponding to the characteristic of the quantization unit 105. In step S110, the inverse orthogonal transform unit 109 performs an inverse orthogonal transform on the orthogonal transform coefficient obtained by the process performed in step S107 by a characteristic corresponding to the characteristic of the orthogonal transform unit 104.

In step S111, the calculator 110 generates a locally-decoded image (an image corresponding to the input to the calculator 103) by adding the predictive image to the locally-decoded differential information. In step S112, the loop filter 111 performs a loop filter process including a deblocking filter process and an adaptive loop filter process, as appropriate, on the locally-decoded image obtained by the process performed in step S111.

In step S113, the frame memory 112 stores the decoded image on which the loop filter process has been performed by the process performed in step S112. The frame memory 112 also stores an image on which the filter process has not been performed by the loop filter 111, the image being supplied from the calculator 110.

In step S114, the lossless encoding unit 106 encodes the transform coefficient quantized by the process performed in step S108. That is, the lossless encoding such as variable length encoding or arithmetic encoding is performed on the differential image.

The lossless encoding unit 106 encodes the quantized parameter calculated in step S108 and adds it to the encoded data. The lossless encoding unit 106 further encodes the information on the prediction mode of the predictive image selected by the process performed in step S105 and adds it to the encoded data obtained by encoding the differential image. The lossless encoding unit 106 further encodes the optimal intra prediction mode information supplied from the intra prediction unit 114 or the information corresponding to the optimal inter prediction mode supplied from the motion prediction/compensation unit 115, and adds it to the encoded data.

In step S115, the storage buffer 107 accumulates the encoded data obtained by the process performed in step S114. The encoded data accumulated in the storage buffer 107 is read out as appropriate and transmitted to the decoding side through a transmission path and a recording medium.

In step S116, the rate control unit 117 controls the rate of quantization operation by the quantization unit 105 on the basis of the code amount (generated code amount) of the encoded data accumulated in the storage buffer 107 by the process performed in step S115, in order not to cause overflow or underfloor.

The encoding process is complete after the process performed in step S116 has been completed.

[Inter Motion Prediction Process Flow]

Figure 19:
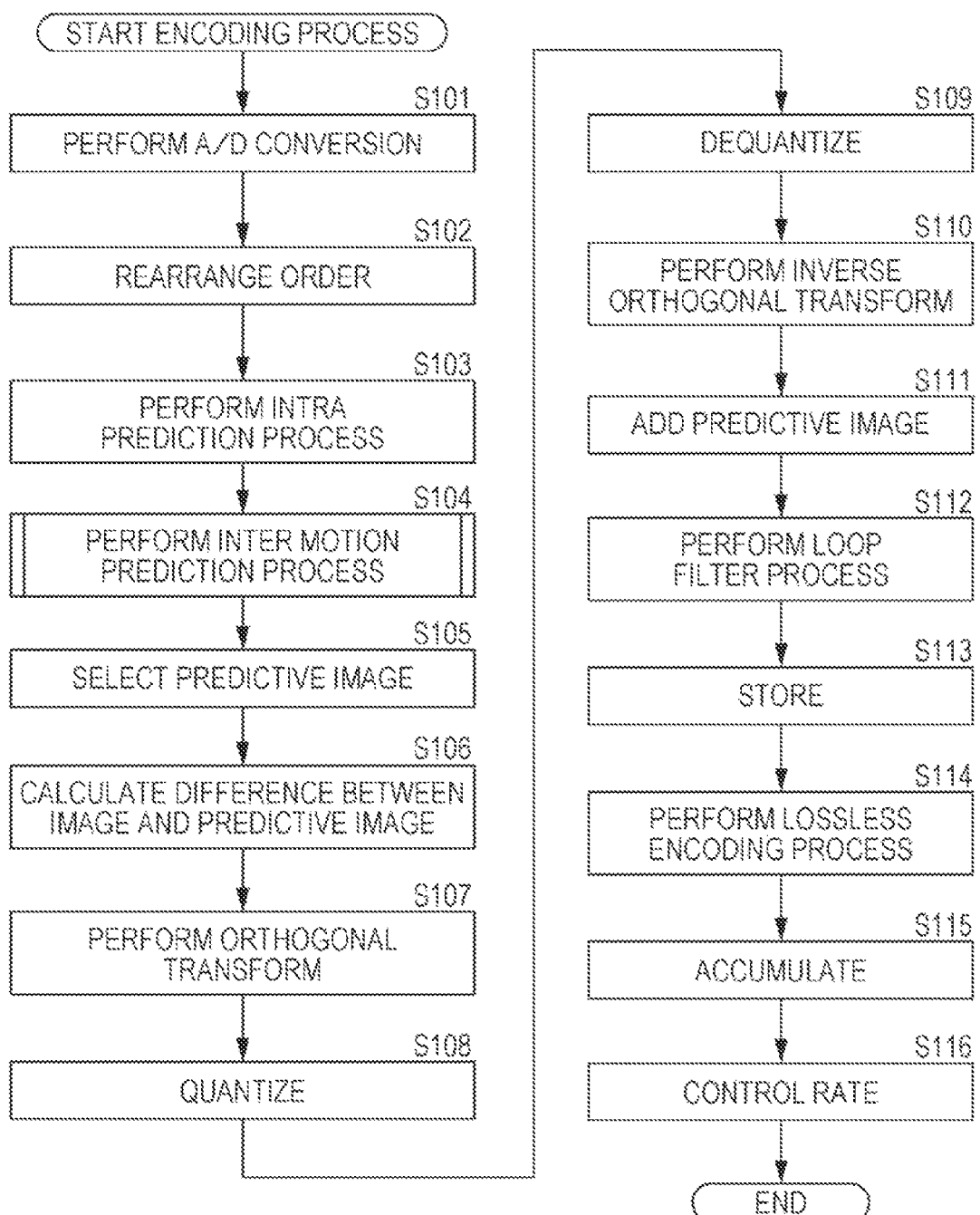
FIG. 19 is a flowchart illustrating an example of a flow of an encoding process.
Figure 20:
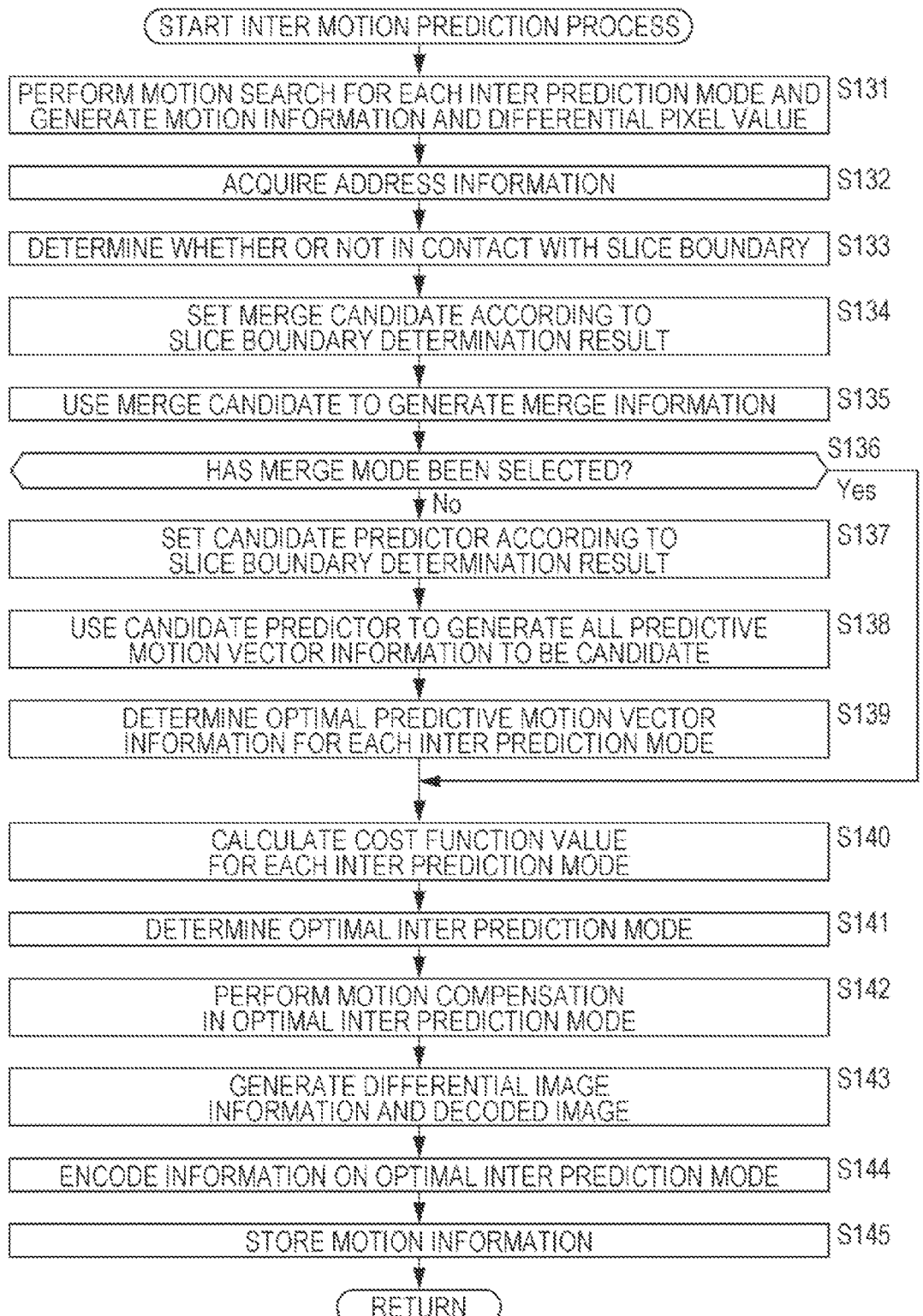
FIG. 20 is a flowchart illustrating an example of a flow of an inter motion prediction process.

Now, an example of the flow of the inter motion prediction process performed in step S104 in FIG. 19 will be described with reference to a flowchart illustrated in FIG. 20.

Once the inter motion prediction process has been started, the motion search part 131 performs motion search in each inter prediction mode to generate the motion information and the differential pixel value, in step S131.

In step S132, the slice boundary determination unit 121 acquires the address information such as the slice boundary region address and the current region address from the lossless encoding unit 106.

In step S133, the slice boundary determination unit 121 determines, on the basis of the various address information acquired in step S132, whether or not the current region is in contact with the slice boundary and the motion information of each candidate for the predictive motion vector information or of each merge candidate is available.

In step S134, the merge candidate setting part 141 sets the merge candidate according to the slice boundary determination result obtained in step S133. For example, when a region with unavailable motion information exists among the merge candidates, the merge candidate setting part 141 sets a substitute region to be the merge candidate.

In step S135, the merge information generation part 142 determines whether or not to select the merge mode, selects a region to merge from among the merge candidates set in step S134, and generates the merge information.

When it is determined in step S136 that the merge mode has not been selected, the merge information generation part 142 proceeds to a process in step S137.

In step S137, the candidate predictor setting part 143 sets a candidate for the predictive motion vector information (a candidate predictor) according to the slice boundary determination result obtained in step S133. For example, when unavailable motion information exists among the candidates, the candidate predictor setting part 143 sets substitute motion information as the candidate for the predictive motion vector information.

In step S138, the predictive motion vector generation part 144 uses the candidate for the predictive motion vector information set in step S137 to generate all candidate predictive motion vector information.

In step S139, the differential motion vector generation part 145 determines the optimal predictive motion vector information for each inter prediction mode and generates a differential motion vector between the predictive motion vector information and the motion information of the current region. The differential motion vector generation part 145 proceeds to a process in step S140 after performing the process in step S139.

On the other hand, when it is determined in step S136 that the merge mode has been selected, the merge information generation part 142 proceeds to the process in step S140.

In step S140, the cost function calculation part 132 calculates the cost function value for each inter prediction mode.

In step S141, the mode determination part 133 uses the cost function value calculated in step S140 to determine the optimal inter prediction mode (also referred to as the optimal prediction mode) that is the inter prediction mode determined to be the optimal.

In step S142, the motion compensation part 134 performs motion compensation in the optimal inter prediction mode. In step S143, the motion compensation part 134 supplies the predictive image obtained by the motion compensation performed in step S142 to the calculator 103 and the calculator 110 through the predictive image selection unit 116, and generates the differential image information and the decoded image. In step S144, the motion compensation part 134 supplies the information on the optimal inter prediction mode to the lossless encoding unit 106 which then encodes the information. The information on the optimal inter prediction mode includes the optimal prediction mode information, the merge information, the differential motion information, the code number for the predictive motion vector information, and the like.

In step S145, the motion information buffer 135 stores the motion information of the optimal inter prediction mode selected. The motion information buffer 135 ends the inter motion prediction process upon having stored the motion information.

As described above, the motion vector encoding unit 122 can suppress the decrease in the number of candidates in the MV competition and the merge mode by performing each of the processes. The image encoding device 100 can improve the encoding efficiency as a result.

2. Second Embodiment

Image Decoding Device

Figure 21:
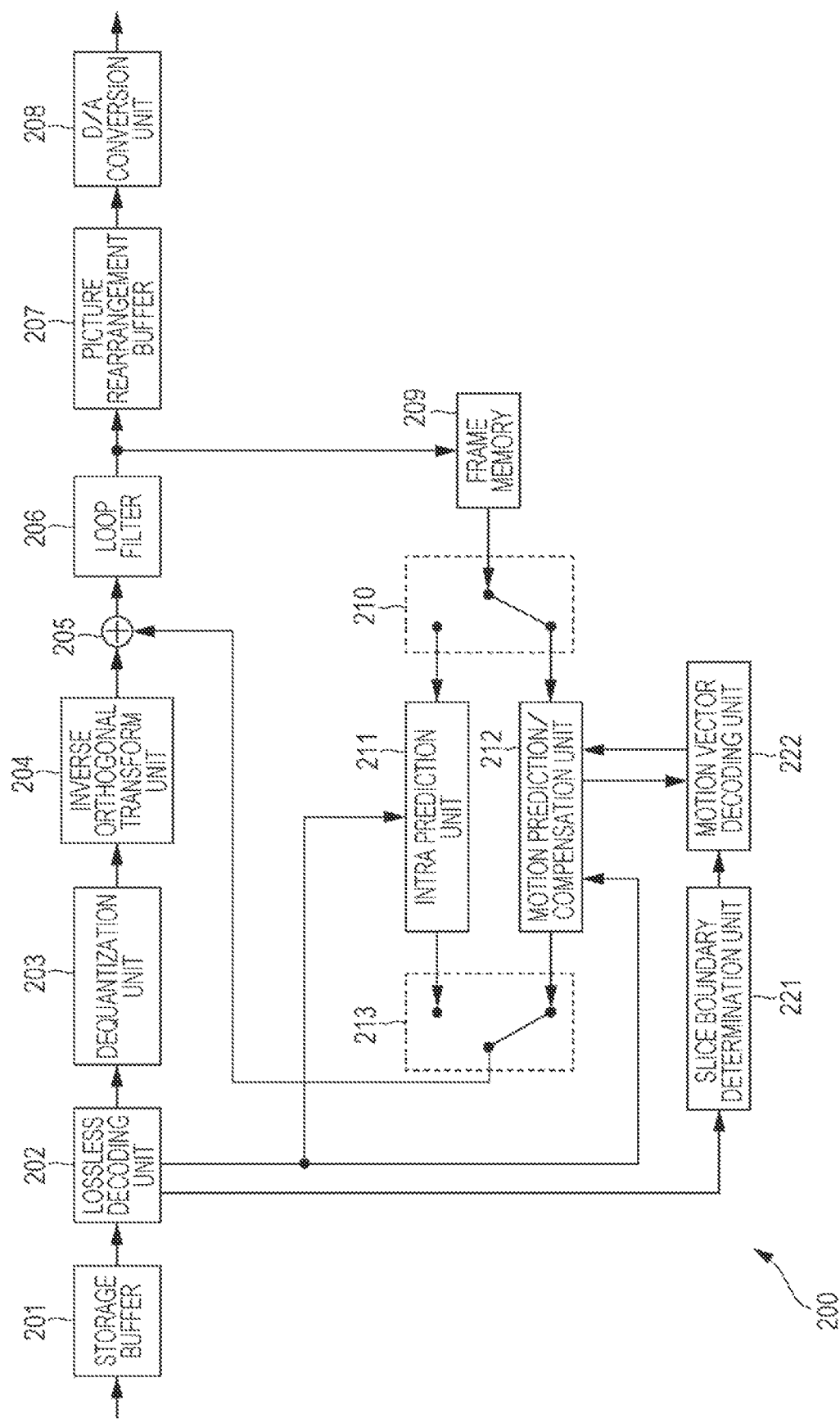
FIG. 21 is a block diagram illustrating an example of a main configuration of an image decoding device.

A process of decoding the data encoded in the aforementioned manner will now be described. FIG. 21 is a block diagram illustrating an example of a main configuration of an image decoding device corresponding to the image encoding device 100 illustrated in FIG. 1.

An image decoding device 200 illustrated in FIG. 21 decodes encoded data generated by the image encoding device 100 by a decoding method corresponding to the encoding method. Note that, as with the image encoding device 100, the image decoding device 200 is adapted to perform inter prediction by the unit of prediction unit (PU).

As illustrated in FIG. 21, the image decoding device 200 includes a storage buffer 201, a lossless decoding unit 202, a dequantization unit 203, an inverse orthogonal transform unit 204, a calculator 205, a loop filter 206, a picture rearrangement buffer 207, a D/A conversion unit 208, a frame memory 209, a selection unit 210, an intra prediction unit 211, a motion prediction/compensation unit 212, and a selection unit 213.

The image decoding device 200 further includes a slice boundary determination unit 221 and a motion vector decoding unit 222.

The storage buffer 201 stores encoded data that is transmitted and supplies the encoded data to the lossless decoding unit 202 at a predetermined timing. The lossless decoding unit 202 decodes information, which is encoded by a lossless encoding unit 106 illustrated in FIG. 1 and supplied from the storage buffer 201, by a decoding scheme corresponding to an encoding scheme employed by the lossless encoding unit 106. The lossless decoding unit 202 supplies quantized coefficient data of a differential image obtained by decoding, to the dequantization unit 203.

The lossless decoding unit 202 also determines whether an intra prediction mode or an inter prediction mode has been selected as the optimal prediction mode, and supplies information on the optimal prediction mode to either the intra prediction unit 211 or the motion prediction/compensation unit 212 corresponding to the mode that, the lossless decoding unit has determined, has been selected. For example, the information on the optimal prediction mode is supplied to the motion prediction/compensation unit 212 when the image encoding device 100 has determined the inter prediction mode as the optimal prediction mode.

The dequantization unit 203 dequantizes the quantized coefficient data decoded by the lossless decoding unit 202 by a scheme corresponding to the quantization scheme employed by a quantization unit 105 illustrated in FIG. 1, and supplies the coefficient data obtained to the inverse orthogonal transform unit 204.

The inverse orthogonal transform unit 204 performs an inverse orthogonal transform on the coefficient data supplied from the dequantization unit 203 by a scheme corresponding to an orthogonal transform scheme employed by an orthogonal transform unit 104 illustrated in FIG. 1. As a result of the inverse orthogonal transform process, the inverse orthogonal transform unit 204 obtains decoded residual data corresponding to residual data before subjected to the orthogonal transform by the image encoding device 100.

The decoded residual data that has undergone the inverse orthogonal transform is supplied to the calculator 205. A predictive image from the intra prediction unit 211 or the motion prediction/compensation unit 212 is also supplied to the calculator 205 through the selection unit 213.

The calculator 205 adds the decoded residual data and the predictive image together and obtains decoded image data corresponding to image data before subtracting therefrom the predictive image by a calculator 103 in the image encoding device 100. The calculator 205 then supplies the decoded image data to the loop filter 206.

The loop filter 206 appropriately performs a loop filter process including a deblocking filter process and an adaptive loop filter process on the decoded image supplied and supplies the outcome to the picture rearrangement buffer 207.

The loop filter 206 including a deblocking filter and an adaptive loop filter performs the filter process on the decoded image supplied from the calculator 205 as deemed appropriate. For example, the loop filter 206 removes block distortion in the decoded image by performing the deblocking filter process on the decoded image. The loop filter 206 also improves image quality by performing the loop filter process on the outcome of the deblocking filter process (the decoded image from which the block distortion has been removed) by using a Wiener Filter, for example.

Note that the loop filter 206 may be adapted to perform an arbitrary filter process on the decoded image. The loop filter 206 may also perform the filter process by using a filter coefficient supplied from the image encoding device 100 illustrated in FIG. 1.

The loop filter 206 supplies the outcome of the filter process (the decoded image following the filter process) to the picture rearrangement buffer 207 and the frame memory 209. The decoded image output from the calculator 205 can be supplied to the picture rearrangement buffer 207 and the frame memory 209 without passing through the loop filter 206, meaning that the filter process by the loop filter 206 can be omitted.

The picture rearrangement buffer 207 rearranges the image. That is, the order of frames rearranged into the encoding order by a picture rearrangement buffer 102 illustrated in FIG. 1 is now rearranged back into the original order of display. The D/A conversion unit 208 performs D/A conversion on the image supplied from the picture rearrangement buffer 207 and outputs it to a display (not shown) on which the supplied image is displayed.

The frame memory 209 stores the decoded image supplied thereto and supplies the stored decoded image to the selection unit 210 as a reference image at a predetermined timing or on the basis of a request from outside such as the intra prediction unit 211 or the motion prediction/compensation unit 212.

The selection unit 210 selects a destination to which the reference image supplied from the frame memory 209 is supplied. The selection unit 210 supplies the reference image supplied from the frame memory 209 to the intra prediction unit 211 when decoding an intra-encoded image. On the other hand, the selection unit 210 supplies the reference image supplied from the frame memory 209 to the motion prediction/compensation unit 212 when decoding an inter-encoded image.

The lossless decoding unit 202 supplies information representing an intra prediction mode obtained by decoding header information to the intra prediction unit 211, as deemed appropriate. The intra prediction unit 211 performs intra prediction by using the reference image acquired from the frame memory 209 and generates a predictive image in the intra prediction mode used in an intra prediction unit 114 illustrated in FIG. 1. The intra prediction unit 211 thereafter supplies the generated predictive image to the selection unit 213.

The motion prediction/compensation unit 212 acquires information obtained by decoding the header information (such as optimal prediction mode information, differential information, and a code number for predictive motion vector information) from the lossless decoding unit 202.

The motion prediction/compensation unit 212 performs inter prediction by using the reference image acquired from the frame memory 209 and generates a predictive image in the inter prediction mode used in a motion prediction/compensation unit 115 illustrated in FIG. 1.

The slice boundary determination unit 221 performs basically the same process as a slice boundary determination unit 121, determining whether or not the current region is in contact with a slice boundary and motion information of a candidate for predictive motion vector information or of a merge candidate is unavailable. The slice boundary determination unit 221 supplies such slice boundary determination result to the motion vector decoding unit 222.

The motion vector decoding unit 222 sets the merge candidate or the candidate for the predictive motion vector information on the basis of the slice boundary determination result supplied from the slice boundary determination unit 221. The motion vector decoding unit 222 then uses the candidate to decode the merge information. That is, the motion vector decoding unit 222 determines whether or not the merge mode has been selected in the prediction performed in the current region when encoding and, when the merge mode has been selected, determines which neighboring region has been merged.

Subsequently, the motion vector decoding unit 222 merges the neighboring region with the current region according to the determination result and supplies the information specifying the neighboring region to the motion prediction/compensation unit 212. The motion prediction/compensation unit 212 uses the motion information of the specified neighboring region to reconstruct the motion information of the current region.

When it is determined that the merge mode has not been selected, the motion vector decoding unit 222 uses the candidate for the predictive motion vector information having been set to reconstruct the predictive motion vector information. In other words, the predictive motion vector information generated by the image encoding device 100 is possibly generated by the replaced candidate. The motion vector decoding unit 222 thus needs to be aware whether or not the candidate has been replaced and, when the replacement has occurred, be aware of the motion information of which neighboring region has been used in order to correctly decode the code number transmitted from the image encoding device 100.

Accordingly, the motion vector decoding unit 222 reproduces the replacement of the candidate for the predictive motion vector information according to the slice boundary determination result, uses the result, and reconstructs the predictive motion vector information from the code number.

The motion vector decoding unit 222 can correctly decode the information supplied from the image encoding device 100 and correctly reconstruct the motion vector information of the current region, as described above, by setting the merge candidate or the candidate for the predictive motion vector information on the basis of the slice boundary determination result by the slice boundary determination unit 221, merging by using the candidate, and reconstructing the predictive motion vector information.

As a result the image decoding device 200 can correctly decode the data encoded by the image encoding device 100 and improve the encoding efficiency.

[Motion Prediction/Compensation Unit, Slice Region Determination Unit, and Motion Vector Decoding Unit]

Figure 22:
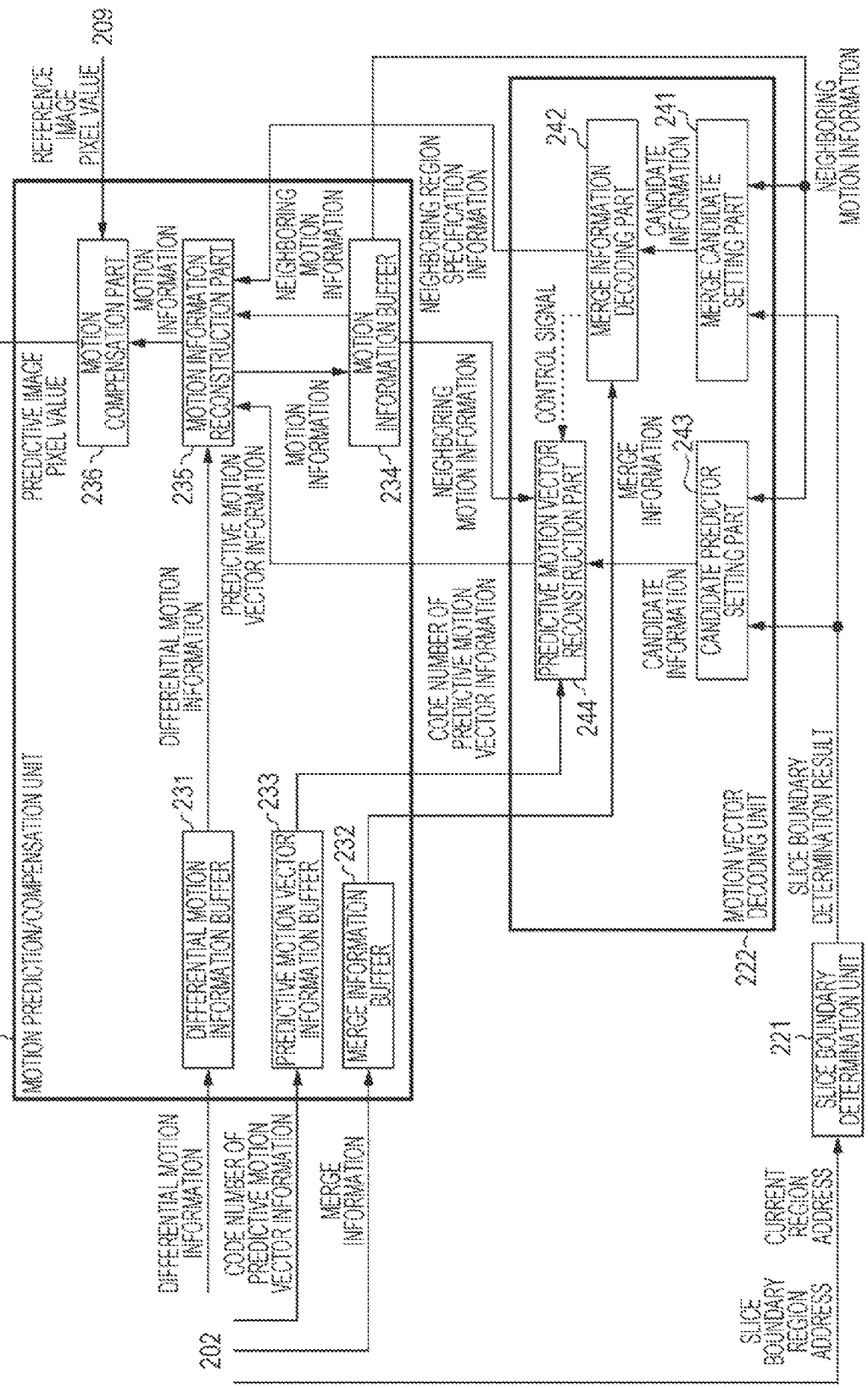
FIG. 22 is a block diagram illustrating an example of a main configuration of the motion prediction/compensation unit, the slice boundary determination unit, and a motion vector decoding unit.

FIG. 22 is a block diagram illustrating an example of a main configuration of the motion prediction/compensation unit 212, the slice boundary determination unit 221, and the motion vector decoding unit 222.

As illustrated in FIG. 22, the motion prediction/compensation unit 212 includes a differential motion information buffer 231, a merge information buffer 232, a predictive motion vector information buffer 233, a motion information buffer 234, a motion information reconstruction part 235, and a motion compensation part 236.

The motion vector decoding unit 222 includes a merge candidate setting part 241, a merge information decoding part 242, a candidate predictor setting part 243, and a predictive motion vector reconstruction part 244.

The differential motion information buffer 231 stores the differential motion information supplied from the lossless decoding unit 202. This differential motion information supplied from the image encoding device 100 is the differential motion information in the inter prediction mode that is selected as the optimal prediction mode. The differential motion information buffer 231 supplies the stored differential motion information to the motion information reconstruction part 235 at a predetermined timing or on the basis of a request sent from the motion information reconstruction part 235.

The merge information buffer 232 stores the merge information supplied from the lossless decoding unit 202. This merge information supplied from the image encoding device 100 is the merge motion information in the inter prediction mode that is selected as the optimal prediction mode. The merge information buffer 232 supplies the stored merge information to the merge information decoding part 242 in the motion vector decoding unit 222 at a predetermined timing or on the basis of a request sent from the merge information decoding part 242.

The predictive motion vector information buffer 233 stores the code number of the predictive motion vector information supplied from the lossless decoding unit 202. This code number of the predictive motion vector information is supplied from the image encoding device 100 and assigned to the predictive motion vector information in the inter prediction mode that is selected as the optimal prediction mode. The predictive motion vector information buffer 233 supplies the stored code number of the predictive motion vector information to the predictive motion vector reconstruction part 244 at a predetermined timing or on the basis of a request sent from the predictive motion vector reconstruction part 244.

The slice boundary determination unit 221 acquires from the lossless decoding unit 202 the slice boundary region address and the current region address supplied from the encoding side and performs the slice boundary determination. These pieces of information are stored in a predetermined location of a code stream including the encoded data of the image such as the sequence parameter set, the picture parameter set, or the slice header and are transmitted, for example. Alternatively, the information may be transmitted separately from the code stream.

The slice boundary determination unit 221 supplies the determination result (the slice boundary determination result) to the merge candidate setting part 241 and the candidate predictor setting part 243 in the motion vector decoding unit 222.

The merge candidate setting part 241 in the motion vector decoding unit 222 acquires necessary neighboring motion information of the neighboring region from the motion information buffer 234 as appropriate and sets the merge candidate while replacing the unavailable candidate motion information by the region with the available motion information according to the slice boundary determination result supplied from the slice boundary determination unit 221, as deemed appropriate. The merge candidate setting part 241 supplies the candidate information specifying the merge candidate to the merge information decoding part 242.

The merge information decoding part 242 acquires from the merge information buffer 232 the merge information supplied from the image encoding device 100. The merge information decoding part 242 then decodes the value of each flag such as MergeFlag and MergeLeftFlag included in the merge information. At this time, the merge information decoding part 242 reproduces the candidate replacement on the basis of the candidate information supplied from the merge candidate setting part 241, when the candidate replacement has been performed on the encoding side.

That is, the transmitted flag information alone can only specify a neighboring region L and a neighboring region T as has been the case conventionally. In the actual case, it is possible that the candidate has been replaced on the encoding side and that another neighboring region has been selected as the candidate. The merge information decoding part 242 accurately specifies the neighboring region having actually been selected as the candidate on the basis of the candidate information supplied from the merge candidate setting part 241.

Upon having determined that the merge mode has been selected as a result of decoding the merge information and specified the neighboring region to be merged with the current region, the merge information decoding part 242 supplies neighboring region specification information specifying the neighboring region to the motion information reconstruction part 235.

Upon having determined that the merge mode has not been selected as a result of decoding the merge information, on the other hand, the merge information decoding part 242 supplies a control signal providing the instruction to reconstruct the predictive motion vector information to the predictive motion vector reconstruction part 244.

The candidate predictor setting part 243 acquires necessary neighboring motion information of the neighboring region from the motion information buffer 234 as appropriate and sets the candidate for the predictive motion vector information while replacing the unavailable candidate motion information by the region with the available motion information according to the slice boundary determination result supplied from the slice boundary determination unit 221, as deemed appropriate. The candidate predictor setting part 243 supplies the candidate information specifying the candidate for the predictive motion vector information being set to the predictive motion vector reconstruction part 244.

Once instructed by the merge information decoding part 242 to reconstruct the predictive motion vector information (once the control signal has been supplied), the predictive motion vector reconstruction part 244 acquires from the predictive motion vector information buffer 233 the code number of the predictive motion vector information supplied from the image encoding device 100 and decodes the code number.

As is the case with the merge information decoding part 242, the predictive motion vector reconstruction part 244 at this time reproduces the candidate replacement on the basis of the candidate information supplied from the candidate predictor setting part 243, when the candidate replacement has been performed on the encoding side. The predictive motion vector reconstruction part then correctly specifies the neighboring region with the motion information selected as the predictive motion vector information. The predictive motion vector reconstruction part 244 acquires neighboring motion information of the neighboring region from the motion information buffer 234 and determines the neighboring motion information as the predictive motion vector information. Subsequently, the predictive motion vector reconstruction part 244 supplies the reconstructed predictive motion vector information to the motion information reconstruction part 235 in the motion prediction/compensation unit 212.

When the merge mode has been selected, the motion information reconstruction part 235 acquires from the motion information buffer 234 the motion information of the neighboring region specified by the neighboring region specification information supplied from the merge information decoding part 242, and determines the motion information as the motion information of the current region (or reconstructs the motion information).

When the MV competition has been selected, on the other hand, the motion information reconstruction part 235 acquires from the differential motion information buffer 231 the differential motion information supplied from the image encoding device 100. The motion information reconstruction part 235 then adds the predictive motion vector information acquired from the predictive motion vector reconstruction part 244 to the differential motion information and reconstructs the motion information of the current region (the current PU). The motion information reconstruction part 235 supplies the reconstructed motion information of the current region to the motion compensation part 236.

The motion compensation part 236 uses the motion information of the current region reconstructed by the motion information reconstruction part 235 as described above to perform motion compensation on the reference image pixel value acquired from the frame memory 209 and generate the predictive image. The motion compensation part 236 supplies the predictive image pixel value to the calculator 205 through the selection unit 213.

The motion information reconstruction part 235 also supplies the reconstructed motion information of the current region to the motion information buffer 234.

The motion information buffer 234 stores the motion information of the current region supplied from the motion information reconstruction part 235. The motion information buffer 234 supplies motion information of another region as neighboring motion information to the merge candidate setting part 241, the candidate predictor setting part 243, and the motion vector reconstruction part 244 in the process performed on the other region that is processed temporally after the current region.

Each part performs the process as described above, whereby the image decoding device 200 can correctly decode the data encoded by the image encoding device 100 and improve the encoding efficiency.

[Decoding Process Flow]

The flow of each process performed by the aforementioned image decoding device 200 will now be described. First, an example of the flow of a decoding process will be described with reference to a flowchart illustrated in FIG. 23.

In step S201, the storage buffer 201 accumulates the transmitted code stream once the decoding process has been started. In step S202, the lossless decoding unit 202 decodes the code stream supplied from the storage buffer 201 (the encoded differential image information). That is the I picture, the P picture, and the B picture encoded by the lossless encoding unit 106 illustrated in FIG. 1 are decoded.

At this time the various pieces of information other than the differential image information included in the code stream such as the differential motion information, the code number of the predictive motion vector information, and the merge information are decoded as well.

In step S203, the dequantization unit 203 dequantizes the quantized orthogonal transform coefficient obtained by the process performed in step S202. In step S204, the inverse orthogonal transform unit 204 performs an inverse orthogonal transform on the orthogonal transform coefficient dequantized in step S203.

In step S205, the intra prediction unit 211 or the motion prediction/compensation unit 212 uses the information supplied to perform the prediction process. In step S206, the selection unit 213 selects the predictive image generated in step S205. In step S207, the calculator 205 adds the predictive image selected in step S206 to the differential image information obtained by the inverse orthogonal transform performed in step S204. The original image is decoded as a result.

In step S208, the loop filter 206 appropriately performs a loop filter process including a deblocking filter process and an adaptive loop filter process on the decoded image obtained in step S207.

In step S209, the picture rearrangement buffer 207 rearranges the image on which the filter process has been performed in step S208. Namely, the order of frames rearranged for encoding by the picture rearrangement buffer 102 in the image encoding device 100 is rearranged back to the original order of display.

In step S210, the D/A conversion unit 208 performs D/A conversion on the image, the frame order of which has been rearranged in step S209. This image is then output to a display (not shown) and displayed.

In step S211, the frame memory 209 stores the image on which the filter process has been performed in step S208.

The decoding process is complete once the process in step S211 has been completed.

[Prediction Process Flow]

Figure 23:
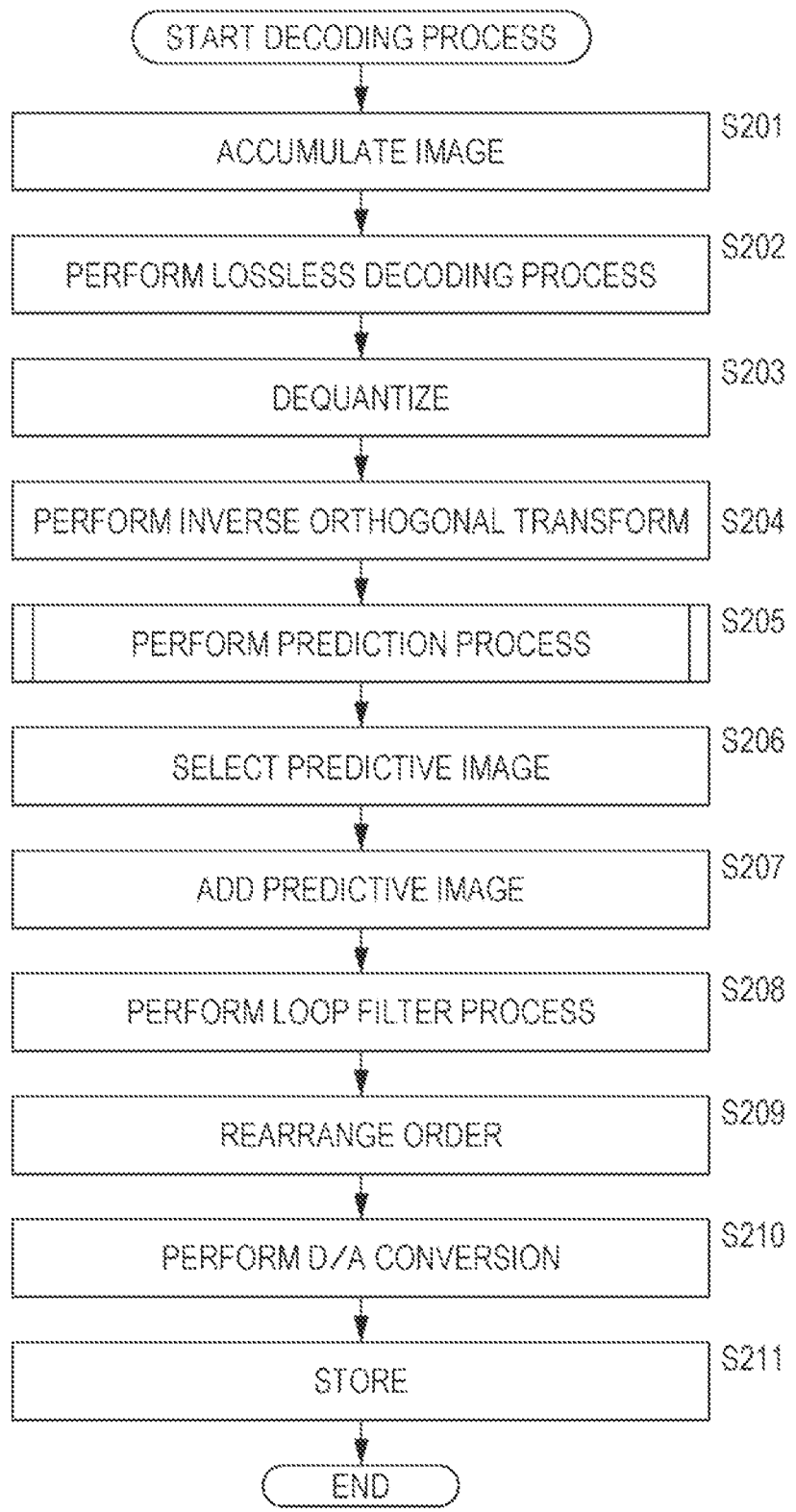
FIG. 23 is a flowchart illustrating an example of a flow of a decoding process.

Next, an example of the flow of the prediction process performed in step S205 in FIG. 23 will be described with reference to a flowchart illustrated in FIG. 24.

Once the prediction process has been started, the lossless decoding unit 202 in step S231 determines whether or not the encoded data to be processed is intra encoded, on the basis of the information on the optimal prediction mode supplied from the image encoding device 100. The lossless decoding unit 202 proceeds to a process in step S232 when it is determined that the encoded data has been intra encoded.

In step S232, the intra prediction unit 211 acquires intra prediction mode information. In step S233, the intra prediction unit 211 uses the intra prediction mode information acquired in step S232 to perform intra prediction and generate the predictive image. The intra prediction unit 211 completes the prediction process after generating the predictive image and proceeds back to the process in FIG. 23.

When it is determined in step S231 that the encoded data has been inter encoded, on the other hand, the lossless decoding unit 202 proceeds to a process in step S234.

In step S234, the motion prediction/compensation unit 212 performs the inter motion prediction process. After completing the inter motion prediction process, the motion prediction/compensation unit 212 completes the prediction process and proceeds back to the process in FIG. 23.

[Flow of Inter Motion Prediction Process]

Figure 24:
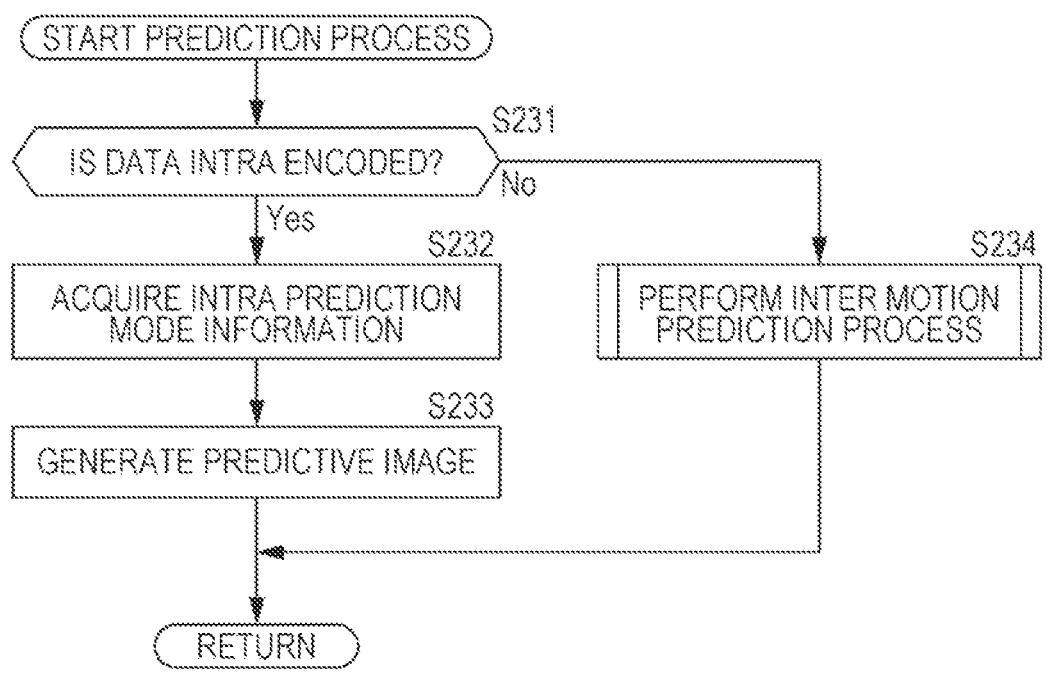
FIG. 24 is a flowchart illustrating an example of a flow of a prediction process.
Figure 25:
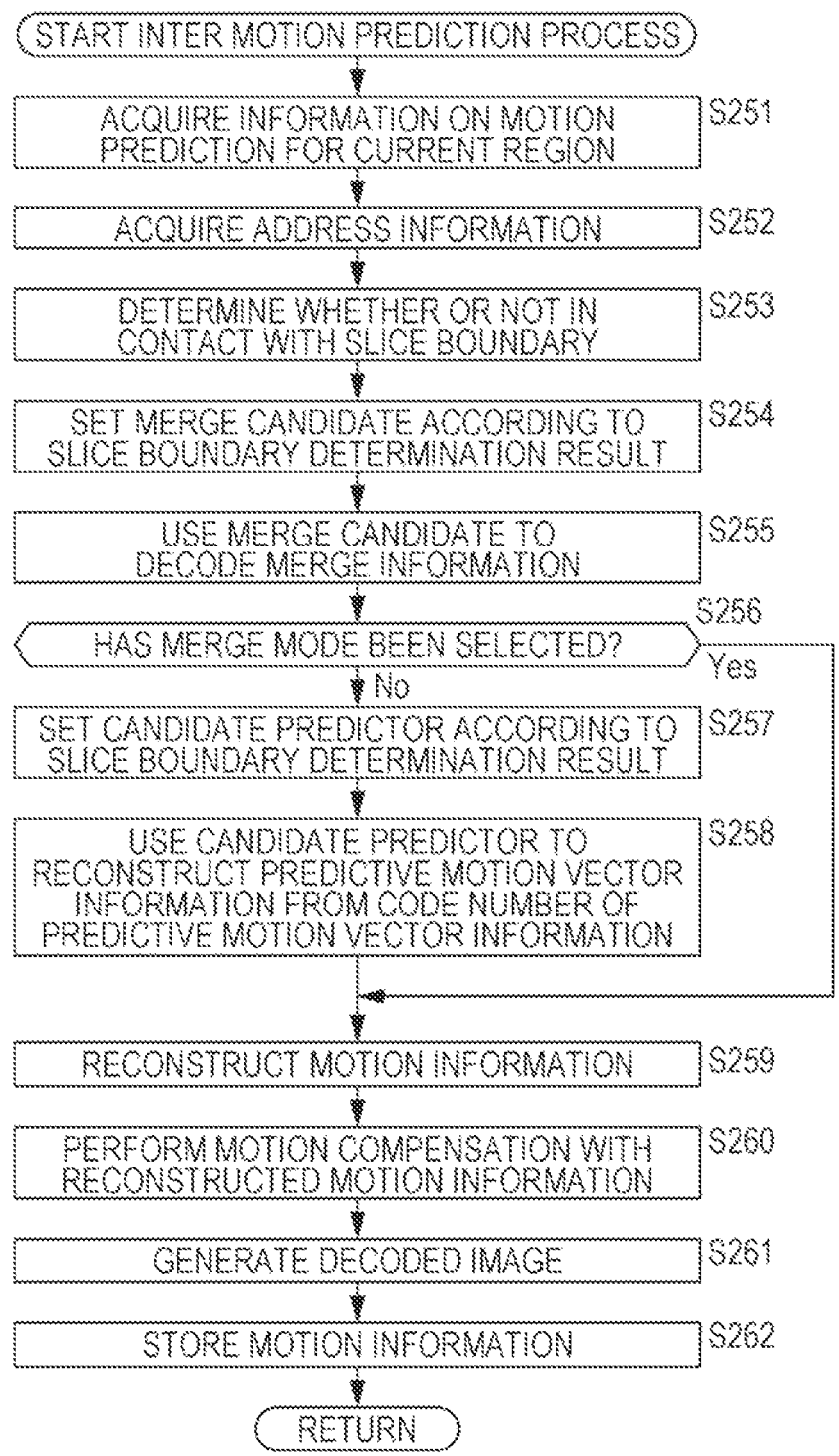
FIG. 25 is a flowchart illustrating an example of a flow of the inter motion prediction process.

Now, an example of the flow of the inter motion prediction process performed in step S234 in FIG. 24 is described with reference to a flowchart illustrated in FIG. 25.

Once the inter motion prediction process has been started, the motion prediction/compensation unit 212 in step S251 acquires information pertaining to the motion prediction of the current region. For example, the differential motion information buffer 231 acquires the differential motion information, the merge information buffer 232 acquires the merge information, and the predictive motion vector information buffer 233 acquires the code number of the predictive motion vector information.

In step S252, the slice boundary determination unit 221 acquires the address information such as the slice boundary region address and the current region address. In step S253, the slice boundary determination unit 221 determines, on the basis of the address information acquired in step S252, whether or not the current region is in contact with the slice boundary as well as the motion information of the neighboring region to be the merge candidate or the candidate for the predictive motion vector information is available.

In step S254, the merge candidate setting part 241 sets the merge candidate according to the result of the slice boundary determination performed in step S253. In step S255, the merge information decoding part 242 uses the merge candidate set in step S253 to decode the merge information and, when the merge mode has been selected, specify the neighboring region to be merged.

In step S256, the merge information decoding part 242 determines whether or not the merge mode has been selected and, when it is determined that the merge mode has been selected, proceeds to a process in step S257.

In step S257, the candidate predictor setting part 243 sets the candidate for the predictive motion vector information (the candidate predictor) according to the slice boundary determination result obtained in step S253.

In step S258, the predictive motion vector reconstruction part 244 uses the candidate predictor to reconstruct the predictive motion vector information from the code number of the predictive motion vector information. The predictive motion vector reconstruction part 244 proceeds to a process in step S259 once the predictive motion vector information has been reconstructed. When it is determined in step S256 that the merge mode has been selected, the merge information decoding part 242 proceeds to a process in step S259.

In step S259, the motion information reconstruction part 235 uses the decoding result of the merge information in step S255 or the predictive motion vector information reconstructed in step S258 to reconstruct the motion information of the current region.

In step S260, the motion compensation part 236 uses the motion information reconstructed in step S259 to perform the motion compensation and generate the predictive image.

In step S261, the motion compensation part 236 supplies the predictive image generated in step S260 to the calculator 205 through the selection unit 213 and generates the decoded image.

In step S262, the motion information buffer 234 stores the motion information reconstructed in step S259.

After completing the process in step S262, the motion information buffer 234 completes the inter motion prediction process and proceeds back to the process in FIG. 24.

The image decoding device 200 can correctly decode the data encoded by the image encoding device 100 and improve the encoding efficiency by performing each of the processes as described above.

As with the MPEG and H.26x, for example, the present technique can be applied to an image encoding device and an image decoding device used in receiving image information (bit stream) compressed by the orthogonal transform such as the discrete cosine transform and the motion compensation through a network medium such as satellite broadcasting, cable television, Internet, or a mobile telephone. The present technique can also be applied to an image encoding device and an image decoding device used in performing a process on a storage medium such as an optical disk, a magnetic disk, or a flash memory. Furthermore, the present technique can be applied to a motion prediction compensation device included in these image encoding device and the image decoding device.

3. Third Embodiment

Personal Computer

The aforementioned series of processes can be executed by hardware or software. A program configuring the software is installed to a computer when the series of processes is executed by the software. The computer here includes a computer incorporated into dedicated hardware and a general-purpose personal computer capable of executing various functions by installing various programs.

Figure 26:
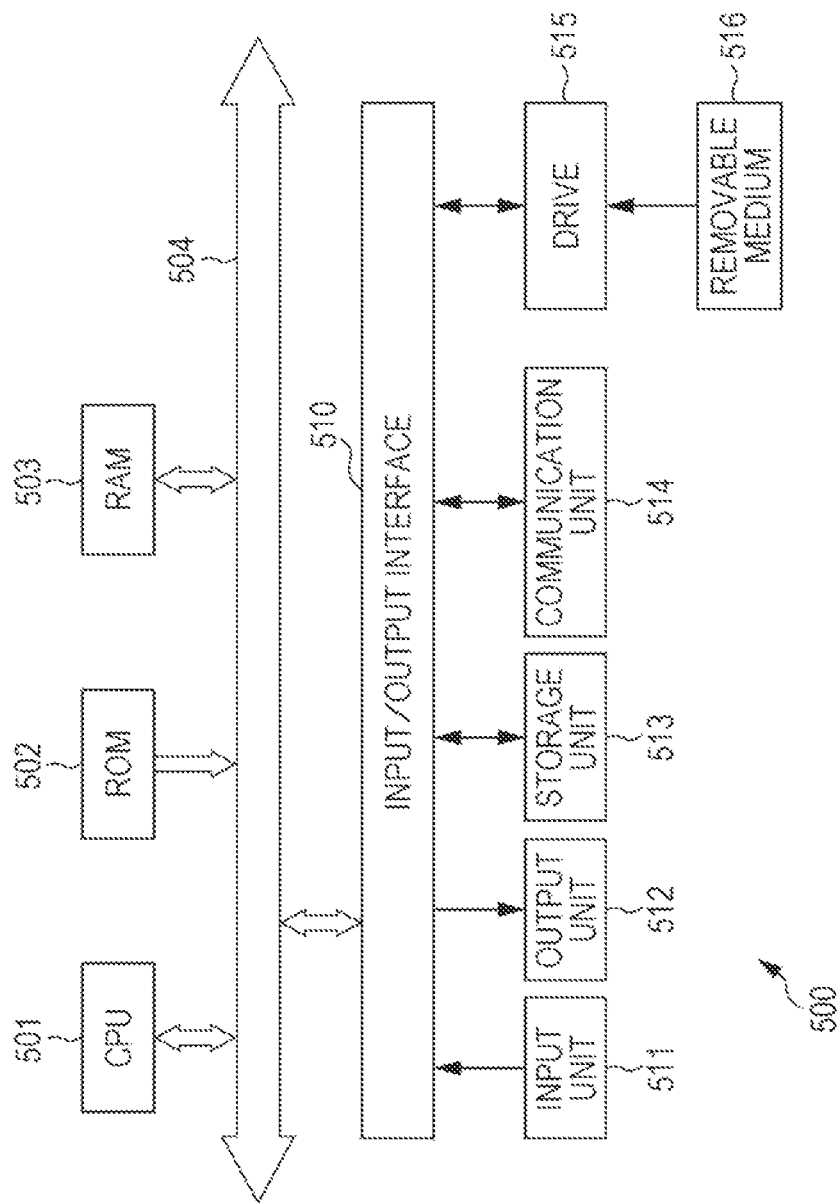
FIG. 26 is a block diagram illustrating an example of a main configuration of a personal computer.

As illustrated in FIG. 26, a CPU (Central Processing Unit) 501 of a personal computer 500 executes various processes according to a program stored in a ROM (Read Only Memory) 502 or a program loaded to a RAM (Random Access Memory) 503 from a storage unit 513. The RAM 503 also stores data or the like necessary for the CPU 501 to execute the various processes, as deemed appropriate.

The CPU 501, the ROM 502, and the RAM 503 are connected to one another via a bus 504. An input/output interface 510 is also connected to the bus 504.

Connected to the input/output interface 510 are an input unit 511 including a keyboard and a mouse, an output unit 512 including a CRT (Cathode Ray Tube) or LCD (Liquid Crystal Display) display and a speaker, the storage unit 513 including a hard disk or the like, and a communication unit 514 including a modem or the like. The communication unit 514 performs a communication process through a network including Internet.

Moreover, a drive 515 is connected to the input/output interface 510 as needed while a removable medium 521 such as a magnetic disk, an optical disk, a magneto-optical disk, or a semiconductor memory is mounted to the drive as appropriate, so that a computer program read out of the medium is installed to the storage unit 513 as needed.

When the aforementioned series of processes is executed by the software, the program configuring the software is installed from the network or a recording medium.

As illustrated in an example in FIG. 26, for example, the recording medium is configured by: the removable medium 521 including the magnetic disk (including a flexible disk), the optical disk (including a CD-ROM (Compact Disc-Read Only Memory) and a DVD (Digital Versatile Disc)), the magneto-optical disk (including an MD (Mini Disc)), or the semiconductor memory in which a program is recorded and which is distributed to deliver the program to a user separately from the device itself; the ROM 502 in which the program is recorded and which is delivered to a user while being incorporated in the device itself in advance; and the hard disk included in the storage unit 513.

Note that the program executed by the computer may be a program performing a process in time series along the order described herein, or a program performing a process in parallel or at a required timing when called, for example.

Furthermore, a step of describing the program recorded in the recording medium herein includes not only a process performed in time series along the order described but also a process that is performed in parallel or individually.

A system herein represents the whole device including a plurality of devices.

The configuration described as one device (or processing unit) above may be divided into a plurality of devices (or processing units). To the contrary, the configuration described as the plurality of devices (or processing units) above may be integrated into one device (or processing unit). Moreover, a configuration other than the aforementioned configuration may certainly be added to the configuration of each device (or processing unit). Furthermore, apart of the configuration of some device (or processing unit) may be included in the configuration of another device (or another processing unit) as long as the system-wide configuration and operation are substantially the same. That is, the present technique is not limited to the aforementioned embodiments but can take various changes without departing from the scope of the present technique.

The image encoding device and the image decoding device according to the aforementioned embodiments can be applied to various electronic devices including: a transmitter or a receiver used in cable broadcasting such as the satellite broadcasting and cable TV, distribution on the Internet, or distribution to a terminal in cellular communication; a recording device which records an image into a medium such as the optical disk, the magnetic disk or a flash memory; and a reproduction device which reproduces the image from these storage media. Four application examples will be described below.

4. Fourth Embodiment

First Application Example

Television Set

Figure 27:
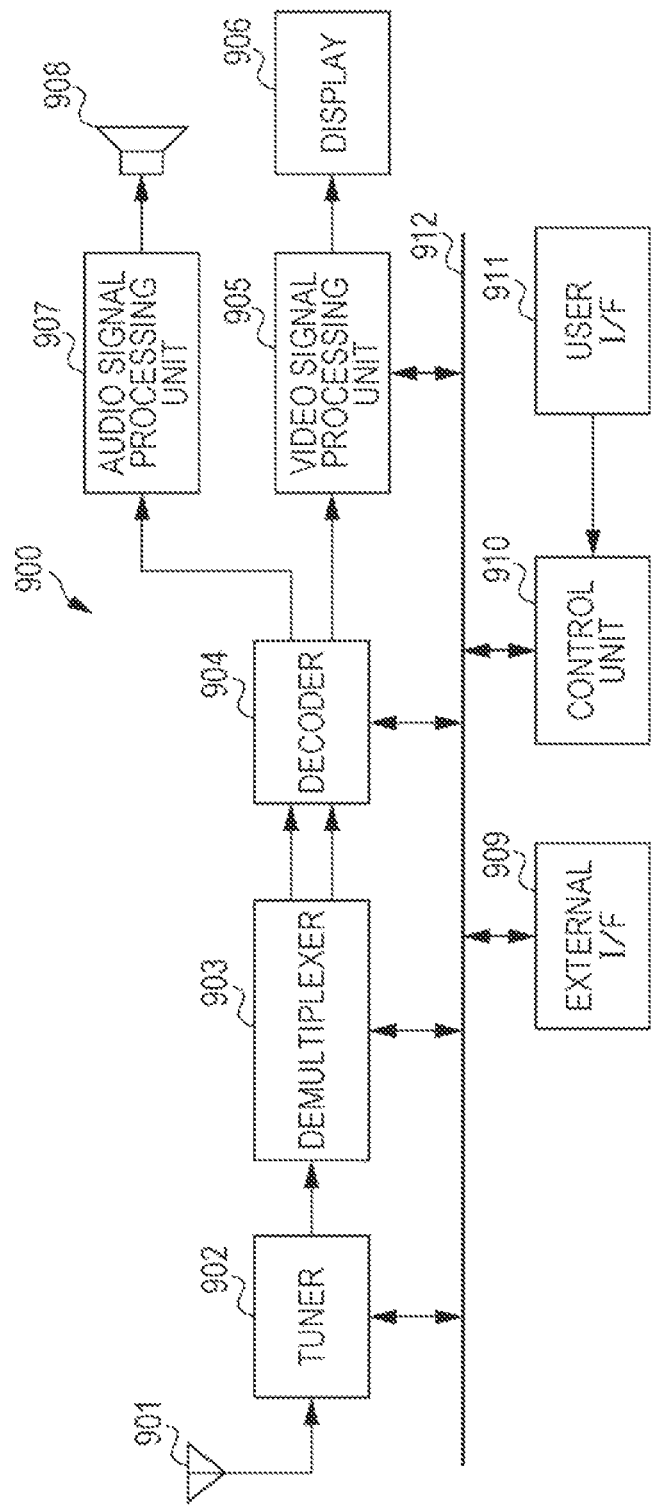
FIG. 27 is a block diagram illustrating an example of a schematic configuration of a television device.

FIG. 27 is a diagram illustrating an example of a schematic configuration of a television device applying the aforementioned embodiment. A television device 900 includes an antenna 901, a tuner 902, a demultiplexer 903, a decoder 904, a video signal processing unit 905, a display 906, an audio signal processing unit 907, a speaker 908, an external interface 909, a control unit 910, a user interface 911, and a bus 912.

The tuner 902 extracts a signal of a desired channel from a broadcast signal received through the antenna 901 and demodulates the extracted signal. The tuner 902 then outputs an encoded bit stream obtained by the demodulation to the demultiplexer 903. That is, the tuner 902 has a role as transmission means receiving the encoded stream in which an image is encoded, in the television device 900.

The demultiplexer 903 isolates a video stream and an audio stream in a program to be viewed from the encoded bit stream and outputs each of the isolated streams to the decoder 904. The demultiplexer 903 also extracts auxiliary data such as an EPG (Electronic Program Guide) from the encoded bit stream and supplies the extracted data to the control unit 910. Here, the demultiplexer 903 may descramble the encoded bit stream when it is scrambled.

The decoder 904 decodes the video stream and the audio stream that are input from the demultiplexer 903. The decoder 904 then outputs video data generated by the decoding process to the video signal processing unit 905. Furthermore, the decoder 904 outputs audio data generated by the decoding process to the audio signal processing unit 907.

The video signal processing unit 905 reproduces the video data input from the decoder 904 and displays the video on the display 906. The video signal processing unit 905 may also display an application screen supplied through the network on the display 906. The video signal processing unit 905 may further perform an additional process such as noise reduction on the video data according to the setting. Furthermore, the video signal processing unit 905 may generate an image of a GUI (Graphical User Interface) such as a menu, a button, or a cursor and superpose the generated image onto the output image.

The display 906 is driven by a drive signal supplied from the video signal processing unit 905 and displays video or an image on a video screen of a display device (such as a liquid crystal display, a plasma display, or an GELD (Organic ElectroLuminescence Display)).

The audio signal processing unit 907 performs a reproducing process such as D/A conversion and amplification on the audio data input from the decoder 904 and outputs the audio from the speaker 908. The audio signal processing unit 907 may also perform an additional process such as noise reduction on the audio data.

The external interface 909 is an interface that connects the television device 900 with an external device or a network. For example, the decoder 904 may decode a video stream or an audio stream received through the external interface 909. This means that the external interface 909 also has a role as the transmission means receiving the encoded stream in which an image is encoded, in the television device 900.

The control unit 910 includes a processor such as a CPU and a memory such as a RAM and a ROM. The memory stores a program executed by the CPU, program data, EPG data, and data acquired through the network. The program stored in the memory is read by the CPU at the start-up of the television device 900 and executed, for example. By executing the program, the CPU controls the operation of the television device 900 in accordance with an operation signal that is input from the user interface 911, for example.

The user interface 911 is connected to the control unit 910. The user interface 911 includes a button and a switch for a user to operate the television device 900 as well as a reception part which receives a remote control signal, for example. The user interface 911 detects a user operation through these components, generates the operation signal, and outputs the generated operation signal to the control unit 910.

The bus 912 mutually connects the tuner 902, the demultiplexer 903, the decoder 904, the video signal processing unit 905, the audio signal processing unit 907, the external interface 909, and the control unit 910.

The decoder 904 in the television device 900 configured in the aforementioned manner has a function of the image decoding device according to the aforementioned embodiment. Accordingly, a decrease in the number of candidates in the MV competition or the merge mode can be suppressed when decoding an image in the television device 900, thereby achieving the improved encoding efficiency.

5. Fifth Embodiment

Second Application Example

Mobile Telephone

Figure 28:
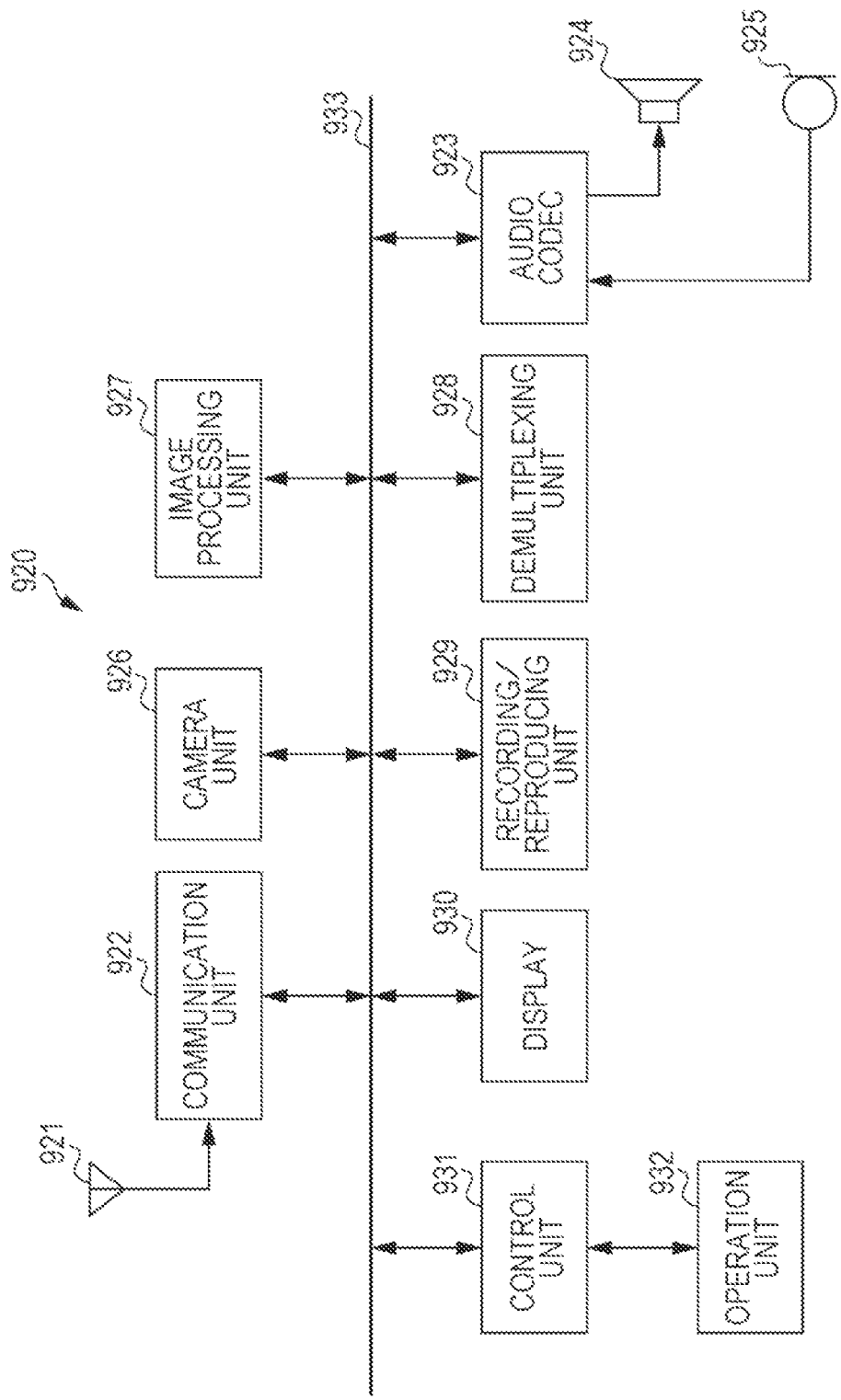
FIG. 28 is a block diagram illustrating an example of a schematic configuration of a mobile telephone.

FIG. 28 is a diagram illustrating an example of a schematic configuration of a mobile telephone applying the aforementioned embodiment. A mobile telephone 920 includes an antenna 921, a communication unit 922, an audio codec 923, a speaker 924, a microphone 925, a camera unit 926, an image processing unit 927, a demultiplexing unit 928, a recording/reproducing unit 929, a display 930, a control unit 931, an operation unit 932, and a bus 933.

The antenna 921 is connected to the communication unit 922. The speaker 924 and the microphone 925 are connected to the audio codec 923. The operation unit 932 is connected to the control unit 931. The bus 933 mutually connects the communication unit 922, the audio codec 923, the camera unit 926, the image processing unit 927, the demultiplexing unit 928, the recording/reproducing unit 929, the display 930, and the control unit 931.

The mobile telephone 920 performs an operation such as transmitting/receiving an audio signal, transmitting/receiving an electronic mail or image data, imaging an image, or recording data in various operation modes including an audio call mode, a data communication mode, a photography mode, and a videophone mode.

In the audio call mode, an analog audio signal generated by the microphone 925 is supplied to the audio codec 923. The audio codec 923 then converts the analog audio signal into audio data, performs A/D conversion on the converted audio data, and compresses the data. The audio codec 923 thereafter outputs the compressed audio data to the communication unit 922. The communication unit 922 encodes and modulates the audio data to generate a transmission signal. The communication unit 922 then transmits the generated transmission signal to a base station (not shown) through the antenna 921. Furthermore, the communication unit 922 amplifies a radio signal received through the antenna 921, converts a frequency of the signal, and acquires a reception signal. The communication unit 922 thereafter demodulates and decodes the reception signal to generate the audio data and output the generated audio data to the audio codec 923. The audio codec 923 expands the audio data, performs D/A conversion on the data, and generates the analog audio signal. The audio codec 923 then outputs the audio by supplying the generated audio signal to the speaker 924.

In the data communication mode, for example, the control unit 931 generates character data configuring an electronic mail, in accordance with a user operation through the operation unit 932. The control unit 931 further displays a character on the display 930. Moreover, the control unit 931 generates electronic mail data in accordance with a transmission instruction from a user through the operation unit 932 and outputs the generated electronic mail data to the communication unit 922. The communication unit 922 encodes and modulates the electronic mail data to generate a transmission signal. Then, the communication unit 922 transmits the generated transmission signal to the base station (not shown) through the antenna 921. The communication unit 922 further amplifies a radio signal received through the antenna 921, converts a frequency of the signal, and acquires a reception signal. The communication unit 922 thereafter demodulates and decodes the reception signal, restores the electronic mail data, and outputs the restored electronic mail data to the control unit 931. The control unit 931 displays the content of the electronic mail on the display 930 as well as stores the electronic mail data in a storage medium of the recording/reproducing unit 929.

The recording/reproducing unit 929 includes an arbitrary storage medium that is readable and writable. For example, the storage medium may be a built-in storage medium such as a RAM or a flash memory, or may be an externally-mounted storage medium such as a hard disk, a magnetic disk, a magneto-optical disk, an optical disk, a USB (Unallocated Space Bitmap) memory, or a memory card.

In the photography mode, for example, the camera unit 926 images an object, generates image data, and outputs the generated image data to the image processing unit 927. The image processing unit 927 encodes the image data input from the camera unit 926 and stores an encoded stream in the storage medium of the storing/reproducing unit 929.

In the videophone mode, for example, the demultiplexing unit 928 multiplexes a video stream encoded by the image processing unit 927 and an audio stream input from the audio codec 923, and outputs the multiplexed stream to the communication unit 922. The communication unit 922 encodes and modulates the stream to generate a transmission signal. The communication unit 922 subsequently transmits the generated transmission signal to the base station (not shown) through the antenna 921. Moreover, the communication unit 922 amplifies a radio signal received through the antenna 921, converts a frequency of the signal, and acquires a reception signal. The transmission signal and the reception signal can include an encoded bit stream. Then, the communication unit 922 demodulates and decodes the reception signal to restore the stream, and outputs the restored stream to the demultiplexing unit 928. The demultiplexing unit 928 isolates the video stream and the audio stream from the input stream and outputs the video stream and the audio stream to the image processing unit 927 and the audio codec 923, respectively. The image processing unit 927 decodes the video stream to generate video data. The video data is then supplied to the display 930, which displays a series of images. The audio codec 923 expands and performs D/A conversion on the audio stream to generate an analog audio signal. The audio codec 923 then supplies the generated audio signal to the speaker 924 to output the audio.

The image processing unit 927 in the mobile telephone 920 configured in the aforementioned manner has a function of the image encoding device and the image decoding device according to the aforementioned embodiment. Accordingly, a decrease in the number of candidates in the MV competition or the merge mode can be suppressed when encoding and decoding an image in the mobile telephone 920, thereby achieving the improved encoding efficiency.

6. Sixth Embodiment

Third Application Example

Recording/Reproducing Device

Figure 29:
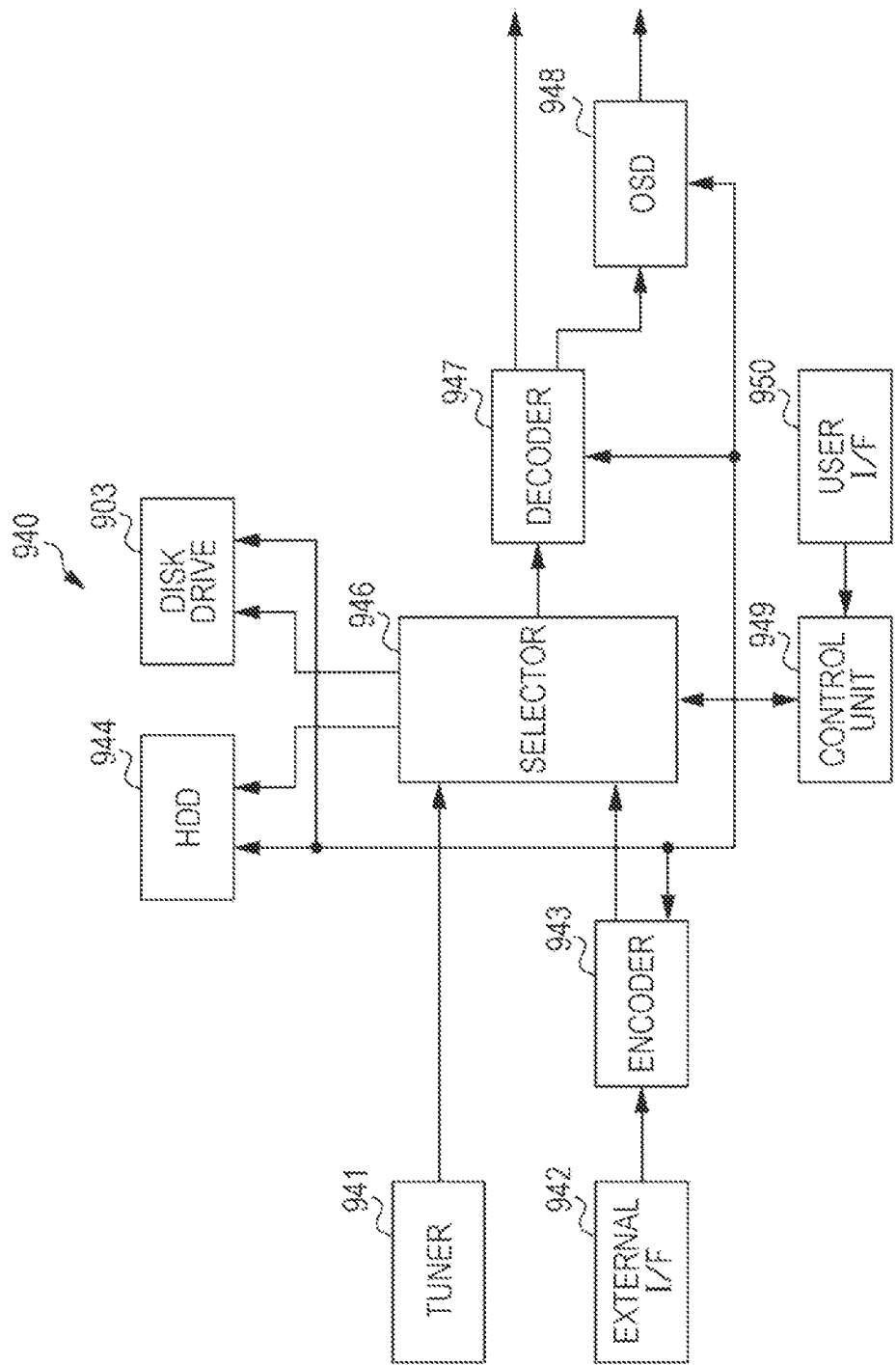
FIG. 29 is a block diagram illustrating an example of a schematic configuration of a recording/reproducing device.

FIG. 29 is a diagram illustrating an example of a schematic configuration of a recording/reproducing device applying the aforementioned embodiment. A recording/reproducing device 940 encodes audio data and video data of a broadcast program received and records the data into a recording medium, for example. The recording/reproducing device 940 may also encode audio data and video data acquired from another device and record the data into the recording medium, for example. In response to a user instruction, for example, the recording/reproducing device 940 reproduces the data recorded in the recording medium on a monitor and a speaker. The recording/reproducing device 940 at this time decodes the audio data and the video data.

The recording/reproducing device 940 includes a tuner 941, an external interface 942, an encoder 943, an HDD (Hard Disk Drive) 944, a disk drive 945, a selector 946, a decoder 947, an OSD (On-Screen Display) 948, a control unit 949, and a user interface 950.

The tuner 941 extracts a signal of a desired channel from a broadcast signal received through an antenna (not shown) and demodulates the extracted signal. The tuner 941 then outputs an encoded bit stream obtained by the demodulation to the selector 946. That is, the tuner 941 has a role as transmission means in the recording/reproducing device 940.

The external interface 942 is an interface which connects the recording/reproducing device 940 with an external device or a network. The external interface 942 may be, for example, an IEEE 1394 interface, a network interface, a USB interface, or a flash memory interface. The video data and the audio data received through the external interface 942 are input to the encoder 943, for example. That is, the external interface 942 has a role as transmission means in the recording/reproducing device 940.

The encoder 943 encodes the video data and the audio data when the video data and the audio data input from the external interface 942 are not encoded. The encoder 943 thereafter outputs an encoded bit stream to the selector 946.

The HDD 944 records, into an internal hard disk, the encoded bit stream in which content data such as video and audio is compressed, various programs, and other data. The HDD 944 reads these data from the hard disk when reproducing the video and the audio.

The disk drive 945 records and reads data into/from a recording medium which is mounted to the disk drive. The recording medium mounted to the disk drive 945 may be, for example, a DVD disk (such as DVD-Video, DVD-RAM, DVD-R, DVD-RW, DVD+R, or DVD+RW) or a Blu-ray (Registered Trademark) disk.

The selector 946 selects the encoded bit stream input from the tuner 941 or the encoder 943 when recording the video and audio, and outputs the selected encoded bit stream to the HDD 944 or the disk drive 945. When reproducing the video and audio, on the other hand, the selector 946 outputs the encoded bit stream input from the HDD 944 or the disk drive 945 to the decoder 947.

The decoder 947 decodes the encoded bit stream to generate the video data and the audio data. The decoder 904 then outputs the generated video data to the OSD 948 and the generated audio data to an external speaker.

The OSD 948 reproduces the video data input from the decoder 947 and displays the video. The OSD 948 may also superpose an image of a GUI such as a menu, a button, or a cursor onto the video displayed.

The control unit 949 includes a processor such as a CPU and a memory such as a RAM and a ROM. The memory stores a program executed by the CPU as well as program data. The program stored in the memory is read by the CPU at the start-up of the recording/reproducing device 940 and executed, for example. By executing the program, the CPU controls the operation of the recording/reproducing device 940 in accordance with an operation signal that is input from the user interface 950, for example.

The user interface 950 is connected to the control unit 949. The user interface 950 includes a button and a switch for a user to operate the recording/reproducing device 940 as well as a reception part which receives a remote control signal, for example. The user interface 950 detects a user operation through these components, generates the operation signal, and outputs the generated operation signal to the control unit 949.

The encoder 943 in the recording/reproducing device 940 configured in the aforementioned manner has a function of the image encoding device according to the aforementioned embodiment. On the other hand, the decoder 947 has a function of the image decoding device according to the aforementioned embodiment. Accordingly, a decrease in the number of candidates in the MV competition or the merge mode can be suppressed when encoding and decoding an image in the recording/reproducing device 940, thereby achieving the improved encoding efficiency.

7. Seventh Embodiment

Fourth Application Example

Imaging Device

Figure 30:
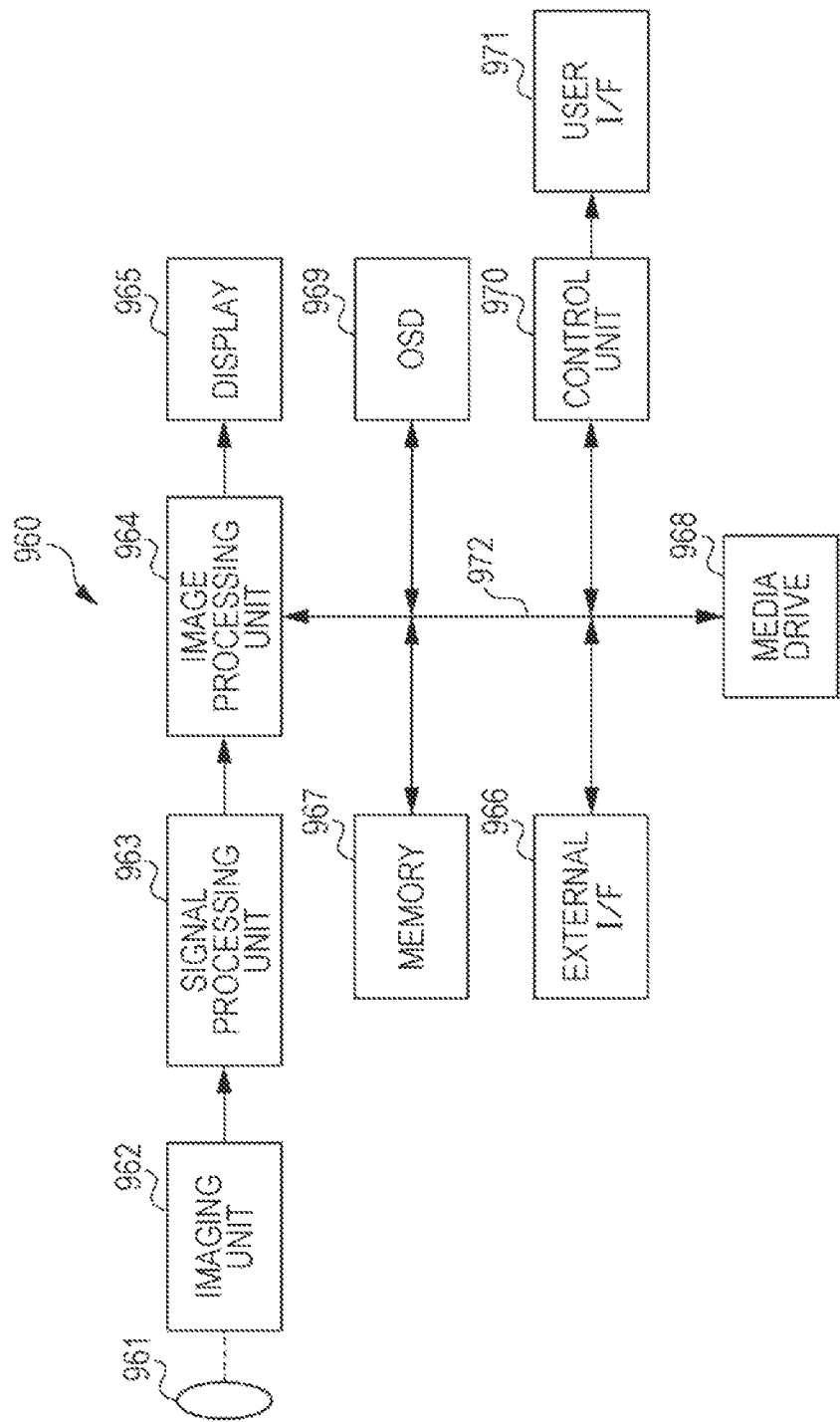
FIG. 30 is a block diagram illustrating an example of a schematic configuration of an imaging device.

FIG. 30 is a diagram illustrating an example of a schematic configuration of an imaging device applying the aforementioned embodiment. An imaging device 960 images an object, generates an image, encodes image data, and records the data into a recording medium.

The imaging device 960 includes an optical block 961, an imaging unit 962, a signal processing unit 963, an image processing unit 964, a display 965, an external interface 966, a memory 967, a media drive 968, an OSD 969, a control unit 970, a user interface 971, and a bus 972.

The optical block 961 is connected to the imaging unit 962. The imaging unit 962 is connected to the signal processing unit 963. The display 965 is connected to the image processing unit 964. The user interface 971 is connected to the control unit 970. The bus 972 mutually connects the image processing unit 964, the external interface 966, the memory 967, the media drive 968, the OSD 969, and the control unit 970.

The optical block 961 includes a focus lens and a diaphragm mechanism. The optical block 961 forms an optical image of the object on an imaging surface of the imaging unit 962. The imaging unit 962 includes an image sensor such as a CCD (Charge Coupled Device) or a CMOS (Complementary Metal Oxide Semiconductor) and performs photoelectric conversion to convert the optical image formed on the imaging surface into an image signal as an electric signal. Subsequently, the imaging unit 962 outputs the image signal to the signal processing unit 963.

The signal processing unit 963 performs various camera signal processes such as a knee correction, a gamma correction and a color correction on the image signal input from the imaging unit 962. The signal processing unit 963 outputs the image data, on which the camera signal process has been performed, to the image processing unit 964.

The image processing unit 964 encodes the image data input from the signal processing unit 963 and generates the encoded data. The image processing unit 964 then outputs the generated encoded data to the external interface 966 or the media drive 968. The image processing unit 964 also decodes the encoded data input from the external interface 966 or the media drive 968 to generate image data. The image processing unit 964 then outputs the generated image data to the display 965. Moreover, the image processing unit 964 may output to the display 965 the image data input from the signal processing unit 963 to display the image. Furthermore, the image processing unit 964 may superpose display data acquired from the OSD 969 onto the image that is output on the display 965.

The OSD 969 generates an image of a GUI such as a menu, a button, or a cursor and outputs the generated image to the image processing unit 964.

The external interface 966 is configured as a USB input/output terminal, for example. The external interface 966 connects the imaging device 960 with a printer when printing an image, for example. Moreover, a drive is connected to the external interface 966 as needed. A removable medium such as a magnetic disk or an optical disk is mounted to the drive, for example, so that a program read from the removable medium can be installed to the imaging device 960. The external interface 966 may also be configured as a network interface that is connected to a network such as a LAN or the Internet. That is, the external interface 966 has a role as transmission means in the imaging device 960.

The recording medium mounted to the media drive 968 may be an arbitrary removable medium that is readable and writable such as a magnetic disk, a magneto-optical disk, an optical disk, or a semiconductor memory. Furthermore, the recording medium may be fixedly mounted to the media drive 968 so that a non-transportable storage unit such as a built-in hard disk drive or an SSD (Solid State Drive) is configured, for example.

The control unit 970 includes a processor such as a CPU and a memory such as a RAM and a ROM. The memory stores a program executed by the CPU as well as program data. The program stored in the memory is read by the CPU at the start-up of the imaging device 960 and then executed. By executing the program, the CPU controls the operation of the imaging device 960 in accordance with an operation signal that is input from the user interface 971, for example.

The user interface 971 is connected to the control unit 970. The user interface 971 includes a button and a switch for a user to operate the imaging device 960, for example. The user interface 971 detects a user operation through these components, generates the operation signal, and outputs the generated operation signal to the control unit 970.

The image processing unit 964 in the imaging device 960 configured in the aforementioned manner has a function of the image encoding device and the image decoding device according to the aforementioned embodiment. Accordingly, a decrease in the number of candidates in the MV competition or the merge mode can be suppressed when encoding and decoding an image in the imaging device 960, thereby achieving the improved encoding efficiency.

Described herein is the example where the various pieces of information such as the prediction mode information and the merge information are multiplexed to the header of the encoded stream and transmitted from the encoding side to the decoding side. The method of transmitting these pieces of information however is not limited to such example. For example, these pieces of information may be transmitted or recorded as separate data associated with the encoded bit stream without being multiplexed to the encoded bit stream. Here, the term "association" means to allow the image included in the bit stream (may be a part of the image such as a slice or a block) and the information corresponding to the current image to establish a link when decoding. Namely, the information may be transmitted on a different transmission path from the image (or the bit stream). The information may also be recorded in a different recording medium (or a different recording area in the same recording medium) from the image (or the bit stream). Furthermore, the information and the image (or the bit stream) may be associated with each other by an arbitrary unit such as a plurality of frames, one frame, or a portion within a frame.

While the preferred embodiments of the present disclosure have been described in detail with reference to the attached drawings, the present disclosure is not to be limited to such examples. It is apparent that those having ordinary skill in the art to which the present disclosure pertains can make various changes or modifications within the scope of the technical idea described in claims, whereby it is to be understood that these changes or modifications certainly pertain to the technical scope of the present disclosure.

Note that the present technique can also employ configurations such as those shown below.

(1) An image processing apparatus including:
a determination unit which determines whether or not motion information of a neighboring region located around a current region is available, the motion information of the neighboring region being used to encode motion information of the current region to be processed; and
an encoding unit which encodes the motion information of the current region by using available motion information of another neighboring region in place of the motion information, which is determined to be unavailable by the determination unit, of the neighboring region.

(2) The image processing apparatus according to (1), wherein the determination unit determines whether or not the motion information of the neighboring region is available on the basis of an address of a boundary of a current slice including the current region and an address of the current region, the current slice being one of a plurality of slices into which a frame is divided.

(3) The image processing apparatus according to (2), wherein the determination unit determines that the motion information of the neighboring region is unavailable when the neighboring region is located outside the current slice of a current frame to be processed.

(4) The image processing apparatus according to any one of (1) to (3), wherein the encoding unit includes:
a candidate setting part which, when motion information of a neighboring region to be a candidate region to merge with the current region is unavailable, sets another neighboring region with available motion information as the candidate in place of the neighboring region; and
a merge information generation part which determines, from among the candidate set by the candidate setting part, a neighboring region to merge with the current region and generates merge information.

(5) The image processing apparatus according to (4), wherein the candidate setting part sets a co-located region of the neighboring region determined to be unavailable by the determination unit as the candidate when the co-located region is available.

(6) The image processing apparatus according to (4), wherein the candidate setting part sets another neighboring region located within a current slice to be processed in a current frame to be processed as the candidate, the current slice being one of a plurality of slices into which a frame is divided.

(7) The image processing apparatus according to (4), wherein the candidate setting part sets a neighboring region located within a reference frame, to which a current frame to be processed refers, as the candidate when the neighboring region determined to be unavailable by the determination unit is located outside the current frame.

(8) The image processing apparatus according to any one of (1) to (7), wherein the encoding unit includes:
a candidate setting part which, when motion information of a neighboring region to be a candidate for predictive motion vector information of the current region is unavailable, sets available motion information of another neighboring region as the candidate in place of the motion information; and
a predictive motion vector generation part which uses any of the candidate set by the candidate setting part to generate the predictive motion vector information of the current region.

(9) The image processing apparatus according to (8), wherein the candidate setting part sets a co-located region of the neighboring region determined to be unavailable by the determination unit as the candidate when the co-located region is available.

(10) The image processing apparatus according to (8), wherein the candidate setting part sets another neighboring region located within a current slice to be processed in a current frame to be processed as the candidate, the current slice being one of a plurality of slices into which a frame is divided.

(11) The image processing apparatus according to (8), wherein the candidate setting part sets a neighboring region located within a reference frame, to which a current frame to be processed refers, as the candidate when the neighboring region determined to be unavailable by the determination unit is located outside the current frame.

(12) A method of processing an image in an image processing apparatus, wherein
a determination unit determines whether or not motion information of a neighboring region located around a current region is available, the motion information of the neighboring region being used to encode motion information of the current region to be processed, and
an encoding unit encodes the motion information of the current region by using available motion information of another neighboring region in place of the motion information, which is determined to be unavailable, of the neighboring region.

(13) An image processing apparatus including:
a determination unit which determines whether or not motion information of a neighboring region located around a current region is available, the motion information of the neighboring region being used to decode motion information of the current region to be processed; and
a decoding unit which decodes encoded motion information of the current region by using available motion information of another neighboring region in place of the motion information, which is determined to be unavailable by the determination unit, of the neighboring region.

(14) The image processing apparatus according to (13), wherein the determination unit determines whether or not the motion information of the neighboring region is available on the basis of an address of a boundary of a current slice including the current region and an address of the current region, the current slice being one of a plurality of slices into which a frame is divided.

(15) The image processing apparatus according to (13) or (14), wherein the determination unit determines that the motion information of the neighboring region is unavailable when the neighboring region is located outside the current slice of a current frame to be processed.

(16) The image processing apparatus according to any one of (13) to (15), wherein the decoding unit includes:

a candidate setting part which, when motion information of a neighboring region to be a candidate region to merge with the current region is unavailable, sets another neighboring region with available motion information as the candidate in place of the neighboring region; and a merge information decoding part which determines, from among the candidate set by the candidate setting part, a neighboring region to merge with the current region and decodes merge information according to the determination.

(17) The image processing apparatus according to (16), wherein the candidate setting part sets a co-located region of the neighboring region determined to be unavailable by the determination unit as the candidate when the co-located region is available.

(18) The image processing apparatus according to (16), wherein the candidate setting part sets another neighboring region located within a current slice to be processed in a current frame to be processed as the candidate, the current slice being one of a plurality of slices into which a frame is divided.

(19) The image processing apparatus according to (16), wherein the candidate setting part sets a neighboring region located within a reference frame, to which a current frame to be processed refers, as the candidate when the neighboring region determined to be unavailable by the determination unit is located outside the current frame.

(20) The image processing apparatus according to any one of (13) to (19), wherein the decoding unit includes:

a candidate setting part which, when motion information of a neighboring region to be a candidate for predictive motion vector information of the current region is unavailable, sets available motion information of another neighboring region as the candidate in place of the motion information; and a predictive motion vector reconstruction part which uses any of the candidate set by the candidate setting part to reconstruct the predictive motion vector information of the current region.

(21) The image processing apparatus according to (20), wherein the candidate setting part sets a co-located region of the neighboring region determined to be unavailable by the determination unit as the candidate when the co-located region is available.

(22) The image processing apparatus according to (20), wherein the candidate setting part sets another neighboring region located within a current slice to be processed in a current frame to be processed as the candidate, the current slice being one of a plurality of slices into which a frame is divided.

(23) The image processing apparatus according to (20), wherein the candidate setting part sets a neighboring region located within a reference frame, to which a current frame to be processed refers, as the candidate when the neighboring region determined to be unavailable by the determination unit is located outside the current frame.

(24) A method of processing an image in an image processing apparatus, wherein a determination unit determines whether or not motion information of a neighboring region located around a current region is available, the motion information of the neighboring region being used to decode motion information of the current region to be processed, and a decoding unit decodes the motion information of the current region by using available motion information of another neighboring region in place of the motion information, which is determined to be unavailable, of the neighboring region.

REFERENCE SIGNS LIST

100 Image encoding device
115 Motion prediction/compensation unit
121 Slice boundary determination unit
122 Motion vector encoding unit
141 Merge candidate setting part
142 Merge information generation part
143 Candidate predictor setting part
144 Predictive motion vector generation part
145 Differential motion vector generation part
200 Image decoding device
212 Motion prediction/compensation unit
221 Slice boundary determination unit
222 Motion vector decoding unit
241 Merge candidate setting part
242 Merge information decoding part
243 Candidate predictor setting part
244 Predictive motion vector reconstruction part

The invention claimed is:

1. An image processing apparatus comprising:
a determination unit which determines whether or not motion information of a neighboring region located around a current region is available for being used to decode motion information of the current region to be processed;
a decoding unit which decodes encoded motion information of the current region by using available motion information of a neighboring region in place of the motion information of the current region;
a candidate setting part which sets a co-located region of the neighboring region determined to be unavailable by the determination unit as a candidate when the co-located region is available; and
a merge information decoding part which decodes merge information using candidates set by the candidate setting part.

2. The image processing apparatus according to claim 1, wherein the determination unit determines that the motion information of the neighboring region is unavailable when the neighboring region is located outside a current slice of a current frame to be processed.

3. The image processing apparatus according to claim 1, wherein the candidate setting part sets another neighboring region located within a current slice to be processed in a current frame to be processed as the candidate, the current slice being one of a plurality of slices into which a frame is divided.

4. The image processing apparatus according to claim 1, wherein the candidate setting part sets a neighboring region located within a reference frame, to which a current frame to be processed refers, as the candidate when the neighboring region determined to be unavailable by the determination unit is located outside the current frame.

5. An image processing apparatus comprising:
a determination unit which determines whether or not motion information of a neighboring region located around a current region is available for being used to decode motion information of the current region to be processed;
a decoding unit which decodes encoded motion information of the current region by using available motion information of a neighboring region in place of the motion information of the current region;
a candidate setting part which, when motion information of a neighboring region to be a candidate for predictive motion vector information of the current region is unavailable, sets available motion information of another neighboring region as the candidate in place of the motion information; and a predictive motion vector reconstruction part which uses any of the candidates set by the candidate setting part to reconstruct the predictive motion vector information of the current region, wherein the candidate setting part sets a co-located region of the neighboring region determined to be unavailable by the determination unit as the candidate when the co-located region is available.

6. The image processing apparatus according to claim 5, wherein the candidate setting part sets another neighboring region located within a current slice to be processed in a current frame to be processed as the candidate, the current slice being one of a plurality of slices into which a frame is divided.

7. The image processing apparatus according to claim 5, wherein the candidate setting part sets a neighboring region located within a reference frame, to which a current frame to be processed refers, as the candidate when the neighboring region determined to be unavailable by the determination unit is located outside the current frame.

8. A method of processing an image in an image processing apparatus, the method comprising:

determining whether or not motion information of a neighboring region located around a current region is available for being used to decode motion information of the current region to be processed;

decoding encoded motion information of the current region by using available motion information of a neighboring region in place of the motion information;

setting a co-located region of the neighboring region, determined to be unavailable, as a candidate when the co-located region is available; and decoding merge information using set candidates.

9. The image processing apparatus according to claim 1, wherein the determination unit determines whether or not the motion information of the neighboring region is available on the basis of an address of a boundary of a current slice including the current region and an address of the current region, the current slice being one of a plurality of slices into which a frame is divided.

10. The image processing apparatus according to claim 1, wherein, when motion information of a neighboring region is unavailable for being a candidate region to merge with the current region, the candidate setting part sets another neighboring region with available motion information as the candidate in place of the neighboring region.

* * * * *